(12) United States Patent
Shimizu et al.

(10) Patent No.: US 10,054,727 B2
(45) Date of Patent: Aug. 21, 2018

(54) UNIAXIALLY STRETCHED MULTI-LAYER LAMINATE FILM, AND OPTICAL MEMBER COMPRISING SAME

(71) Applicant: TEIJIN LIMITED, Osaka-shi, Osaka (JP)

(72) Inventors: Tomoko Shimizu, Tokyo (JP); Taro Oya, Tokyo (JP); Yuya Okada, Tokyo (JP); Koji Kubo, Tokyo (JP)

(73) Assignee: TEIJIN LIMITED, Osaka (JP)

( * ) Notice: Subject to any disclaimer, the term of this patent is extended or adjusted under 35 U.S.C. 154(b) by 0 days.

(21) Appl. No.: 15/324,783

(22) PCT Filed: Jul. 15, 2015

(86) PCT No.: PCT/JP2015/070895
§ 371 (c)(1),
(2) Date: Jan. 9, 2017

(87) PCT Pub. No.: WO2016/010162
PCT Pub. Date: Jan. 21, 2016

(65) Prior Publication Data
US 2017/0205549 A1 Jul. 20, 2017

(30) Foreign Application Priority Data

Jul. 18, 2014 (JP) .................................. 2014-147942
Jul. 18, 2014 (JP) .................................. 2014-147943
Jul. 18, 2014 (JP) .................................. 2014-147944

(51) Int. Cl.
*G02B 5/30* (2006.01)
*G02F 1/1335* (2006.01)
(Continued)

(52) U.S. Cl.
CPC .............. *G02B 5/305* (2013.01); *B32B 27/08* (2013.01); *B32B 27/36* (2013.01); *G02B 5/0268* (2013.01);
(Continued)

(58) Field of Classification Search
CPC ...... G02B 5/305; G02B 5/0268; B32B 27/08; B32B 27/36; B32B 2307/418;
(Continued)

(56) References Cited

U.S. PATENT DOCUMENTS 6,048,627 A * 4/2000 Tsukamoto .......... C08G 63/193
428/31
6,592,966 B1 * 7/2003 Kobayashi .............. B32B 27/36
428/141

(Continued)

FOREIGN PATENT DOCUMENTS

JP       4-268505 A       9/1992
JP       9-506837 A       7/1997
(Continued)

OTHER PUBLICATIONS

Communication dated Jul. 13, 2017, from European Patent Office in counterpart application No. 15822533.4.
(Continued)

*Primary Examiner* — Frank Font
(74) *Attorney, Agent, or Firm* — Sughrue Mion, PLLC

(57) ABSTRACT

Provided is a uniaxially stretched multi-layer laminate film including a first layer and a second layer alternately laminated each other, wherein the first layer is a layer containing a polyester, the polyester containing an ethylene naphthalate unit in an amount of 50 mol % or more and 100 mol % or less on a basis of a repeating unit that constitutes the polyester, and a polymer that forms the second layer is a copolymer polyester containing, as copolymer components,
(Continued)

a 2,6-naphthalenedicarboxylic acid component, an ethylene glycol component, and a trimethylene glycol component, (A) the content of an ethylene naphthalate unit in the polyester of the first layer being 80 mol % or more and 100 mol % or less on a basis of the repeating unit that constitutes the polyester, or (B) the polymer that forms the second layer being the copolymer polyester further containing, as a copolymer component, an alicyclic diol component.

20 Claims, 3 Drawing Sheets

(51) Int. Cl.
G02B 5/02 (2006.01)
B32B 27/36 (2006.01)
B32B 27/08 (2006.01)
(52) U.S. Cl.
CPC .... G02F 1/13362 (2013.01); G02F 1/133528 (2013.01); B32B 2307/418 (2013.01); B32B 2307/42 (2013.01); B32B 2307/516 (2013.01); B32B 2457/202 (2013.01)
(58) Field of Classification Search
CPC .......... B32B 2307/42; B32B 2307/516; B32B 2457/202; G02F 1/133528; G02F 1/13362
USPC .......... 359/485.03, 485.04; 349/96
See application file for complete search history.

(56) References Cited

U.S. PATENT DOCUMENTS

| 6,677,031 | B1 | 1/2004 | Murooka et al. | |
|---|---|---|---|---|
| 6,908,686 | B2* | 6/2005 | Olek | B32B 27/36 156/244.11 |
| 7,300,703 | B2* | 11/2007 | MacDonald | B29C 55/06 257/E51.001 |
| 8,318,289 | B2* | 11/2012 | Robinson | C08J 7/047 428/141 |
| 2002/0064671 | A1 | 5/2002 | Hebrink et al. | |
| 2006/0084780 | A1 | 4/2006 | Hebrink et al. | |
| 2007/0195412 | A1* | 8/2007 | Oya | B32B 7/02 359/487.05 |
| 2008/0063857 | A1* | 3/2008 | Konrad | B32B 27/36 428/323 |
| 2010/0190037 | A1* | 7/2010 | Kinoshita | B32B 27/20 428/837 |
| 2011/0039127 | A1* | 2/2011 | Kinoshita | B32B 27/36 428/847.4 |
| 2011/0135965 | A1* | 6/2011 | Tanaka | B32B 27/08 428/847.4 |
| 2012/0249935 | A1* | 10/2012 | Oya | B32B 27/08 349/96 |
| 2014/0030499 | A1 | 1/2014 | Oya et al. | |
| 2014/0132897 | A1* | 5/2014 | Oya | G02B 5/305 349/96 |
| 2014/0287211 | A1* | 9/2014 | Oya | B32B 27/36 428/216 |
| 2014/0327958 | A1* | 11/2014 | Yoshimura | B32B 27/36 359/360 |
| 2015/0124194 | A1 | 5/2015 | Oya et al. | |
| 2017/0192130 | A1* | 7/2017 | Liu | G02B 1/04 |

FOREIGN PATENT DOCUMENTS

| JP | 9-506984 A | 7/1997 |
|---|---|---|
| JP | 9-506985 A | 7/1997 |
| JP | 9-507308 A | 7/1997 |
| JP | 2002-509043 A | 3/2002 |
| JP | 2005-316511 A | 11/2005 |
| JP | 2008-036868 A | 2/2008 |
| JP | 2008-517139 A | 5/2008 |
| JP | 2008-189868 A | 8/2008 |
| JP | 2009-103817 A | 5/2009 |
| JP | 2012-013919 A | 1/2012 |
| JP | 2013-001013 A | 1/2013 |
| JP | 2013-003409 A | 1/2013 |
| JP | 2014-124845 A | 7/2014 |
| WO | 95/17303 A1 | 6/1995 |
| WO | 95/17691 A1 | 6/1995 |
| WO | 95/17692 A1 | 6/1995 |
| WO | 95/17699 A1 | 6/1995 |
| WO | 01/47711 A1 | 7/2001 |
| WO | 2012/140807 A1 | 10/2012 |
| WO | 2012/173170 A1 | 12/2012 |
| WO | 2014/046225 A1 | 3/2014 |

OTHER PUBLICATIONS

Communication dated Jul. 25, 2017, from European Patent Office in counterpart application No. 15822533.4.
International Search Report for application No. PCT/JP2015/070895 dated Oct. 27, 2015.

* cited by examiner

UNIAXIALLY STRETCHED MULTI-LAYER LAMINATE FILM, AND OPTICAL MEMBER COMPRISING SAME

This is a National Stage of International Application No. PCT/JP2015/070895 filed Jul. 15, 2015 (claiming priority based on Japanese Patent Application Nos. 2014-147942 filed Jul. 18, 2014, 2014-147943 filed Jul. 18, 2014 and 2014-147944 filed Jul. 18, 2014), the contents of which are incorporated herein by reference in their entirety.

TECHNICAL FIELD

The present invention relates to a uniaxially stretched multi-layer laminate film and an optical member composed of the same. In more detail, the present invention relates to a uniaxially stretched multi-layer laminate film which is a polymer film having a multi-layer structure but is provided with reflective polarization performance and interlayer adhesion, and an optical member composed of the same.

BACKGROUND ART (Multi-Layer Film and Brightness Enhancement Film)

A film which a large number of a layer having a low refractive index and a layer having a high refractive index are alternately laminated can be formed into an optical interference film which selectively reflects or transmits light having a specified wavelength due to structural optical interference between the layers. In addition, such a multi-layer laminate film is able to obtain a high reflection comparable to a film using a metal by gradually changing the film thickness or sticking a film having a different reflection peak and can also be used as a metal luster film or a reflection mirror. Furthermore, by stretching such a multi-layer laminate film to only one direction, the stretched film can reflect only a specified polarized light component, and it can also be used as a polarization reflection film. Therefore, it is known that by using such a multi-layer laminate film for liquid crystal displays or the like, it can be used as a brightness enhancement film for liquid crystal displays or the like (see PTLs 1, 2, 3, and 4, etc.).

(Polarizing Plate)

A liquid crystal display device (LCD) that is used for television receivers, personal computers, cellular phones, and the like makes it possible to serve as a display through regulating transmission of light outgone from a light source by using a liquid crystal panel composed of a liquid crystal cell and polarizing plates disposed on both sides thereof. As the polarizing plates stuck to the liquid crystal cell, an absorption type polarizing plate which is called a light-absorption type dichroic linear polarizing plate is generally used. A polarizing plate in which iodine-containing PVA is protected with triacetyl cellulose (TAC) is widely used.

Such an absorption type polarizing plate transmits polarized light in a direction of transmission axis and absorbs almost all of polarized light in a direction orthogonal to the transmission axis. Therefore, it is pointed out that about 50% of the light outgone from a light source device is absorbed by this absorption type polarizing plate, and light utilization efficiency is lowered. Then, in order to use effectively the polarized light in the direction orthogonal to the transmission axis, a configuration in which a reflective polarizer called a brightness enhancement film is used between the light source and the liquid crystal panel has been investigated. As an example of such a reflective polarizer, a polymer-type film that employs the above-described optical interference has been investigated (PTL 5, etc.).

On the other hand, regarding the polarizing plate to be stuck to the liquid crystal cell, various kinds of lamination configurations, inclusive of a reflection display that uses outside light, a transmission display that uses backlight, and the like, in which an absorption type polarizing plate and a reflection type polarizing plate are used in combination, have also been investigated in accordance with kinds and purposes of light used in the display device.

For example, PTL 6 discloses a liquid crystal display device in which an electric field is applied to the liquid crystal layer to vary a retardation value of the liquid crystal and shift a retardation value of the incident polarized light on the liquid crystal layer by a certain amount. As an example of the polarizing plates used on the both sides of the liquid crystal layer, PTL 6 discloses a reflection type polarizing plate of a planar multi-layer structure in which three or more films having birefringence are laminated on the light source side, and an absorption type polarizing plate provided on the opposite side relative to the liquid crystal layer.

In addition, PTL 7 proposes that on the occasion of using an absorption type polarizing plate and a reflection type polarizing plate as polarizing plates to be disposed on the both sides of a liquid crystal cell sandwiching a liquid crystal between flexible substrates, in order to dissolve warping generated due to a difference in the extent of temperature-dependent expansion and contraction between the respective polarizing plates, these polarizing plates are combined to form a specified laminate configuration, thereby dissolving the warping. Then, PTL 7 describes that a birefringent dielectric multi-layer film is used as an example of the reflection type polarizing plate, and specifically discloses a brightness enhancement film.

(Interlayer Adhesion)

However, some of the reflective polarizing polymer films using a multi-layer structure, which have hitherto been investigated, are not sufficient in adhesion between the multi-layer polymers, resulting in a problem that on processing or the like, the multi-layer part causes exfoliation.

For example, in the case of a multi-layer laminate film using polyethylene-2,6-naphthalenedicarboxylate (hereinafter sometimes referred to as "2,6-PEN") for a high refractive index layer and polyethylene naphthalate (PEN) copolymerized with a thermoplastic elastomer or terephthalic acid in an amount of 30 mol % for a low refractive index layer as described in PTL 2 and the like, a difference in refractive index between the layers in a uniaxial stretched direction (X direction) is increased to enhance the reflectance of P-polarized light, whereas a difference in refractive index between the layers in a direction (Y direction) orthogonal to the in-plane direction of the film to enhance the transmission for S polarized light, thereby revealing a certain level of polarization performance.

However, according to the above-described combination of polymers, on the occasion of post-working the multi-layer laminate film, exfoliation is liable to be generated in the multi-layer part due to a cause of application of a stress, or the like. Thus, an enhancement in interlayer adhesion has been desired.

In addition, as a reflective polarizing polymer film having a multi-layer structure capable of being used as a reflective polarizing plate with a higher polarization degree, in PTL 8, the present inventors have investigated a reflection type polarizing plate capable of being used as a polarizing plate adjacent to a liquid crystal cell and composed of a multi-layer structure replaceable for the absorption type polarizing plate and proposed a film in which some specified polymer is used for the high reflective index layer and which when uniaxially aligned, enhances the polarization performance as compared with the conventional reflection type polarizing plates of a multi-layer structure.

However, though the reflective polarizing film proposed in PTL 8 realizes a high polarization degree of around 97 to 98%, there is a case where it may not be said that the interlayer adhesion is sufficient, and hence, a more improvement is demanded.

Then, an object of the present invention is to provide a uniaxially stretched multi-layer laminate film that is a polymer film of a multi-layer structure using a polyethylene naphthalate-based polymer for a layer having high refractive index characteristics, in which not only a certain level of polymerization performance is provided, but also the interlayer adhesion is improved.

(Prism Layer-Provided Reflective Polarization Type Brightness Enhancement Film)

With the spread of cellular phones, the needs for more thinning of display terminals are increasing, and thinning of members installed in the interior of display, such as a reflective polarization type brightness enhancement film, a diffusion film, a prism film, a light guide plate, etc., is demanded. Furthermore, a complex optical film capable of unifying these functions is desired. As an example of such a complex functional film, a prism layer-provided reflective polarization type brightness enhancement film in which a prism structure is formed on a reflective polarization type brightness enhancement film is proposed, as described in PTL 9 and the like.

(Prism Layer Adhesion)

However, when the prism layer is formed on such a reflective polarization type brightness enhancement film, the adhesion is possibly insufficient, and on the occasion of cutting the resulting reflective polarization type brightness enhancement film and installing it in a display terminal, there was a concern that breakage or exfoliation of the prism layer is generated.

On the other hand, in general, in a prism film, a prism layer is formed on a PET film base material. As for a general technique for forming a prism layer, the prism layer is formed by transferring a solvent-free UV curable resin onto the PET film base material. On that occasion, a coating layer is provided on the PET film base material, thereby enhancing the adhesiveness. Such an easily adhesive coating layer is provided in a film forming process of the PET film, and a thermosetting crosslinking agent is added to a binder component, such as polyester-based resins, acrylic resins, urethane-based resins, etc., thereby enhancing the adhesion between the base material and the prism layer. Especially, in the solvent-free UV curable resin as in the prism layer, the enhancement in adhesion due to dissolution of the base material with an organic solvent cannot be expected, and hence, a coating film capable of ensuring the adhesion is extremely limited (see PTLs 10 and 11, etc.).

In the case of forming such an easily adhesive coating film on a reflective polarization type brightness enhancement film, a polyester resin other than PET is frequently used as the reflective polarization type enhancement film, and furthermore, in order to reveal reflective polarization performance, in many cases, a crystallization process is not provided in the film forming process, and therefore, the reactivity of the thermosetting crosslinking agent becomes low. Thus, even by using the same coating liquid composition as in the PET film base material, it was difficult to ensure sufficiently the adhesion to the prism layer.

In addition, in the reflective polarization type brightness enhancement film, a surface layer formed of a specified polyester resin other than PET is liable to be scarred, and hence, it was necessary to stick a protective film or the like during the process. The matter that such a protective film is not used is also demanded, and it was desired to enhance the adhesiveness of the prism layer to the reflective polarization type enhancement film serving as the base material and further to ensure winding-up properties and the like.

Then, a desired object of the present invention is to provide a uniaxially stretched multi-layer laminate film using a polyalkylene naphthalate-based polyester for a high refractive index layer, the multi-layer laminate film being provided with reflective polarization performance and high adhesion between a prism layer to be formed on the film and the film.

PTL 1: JP-A-4-268505
PTL 2: JP-A-9-506837
PTL 3: JP-A-9-506984
PTL 4: WO01/47711
PTL 5: JP-A-9-507308
PTL 6: JP-A-2005-316511
PTL 7: JP-A-2009-103817
PTL 8: JP-A-2012-13919
PTL 9: JP-A-9-506985
PTL 10: JP-A-2008-36868
PTL 11: JP-A-2008-189868

DISCLOSURE OF INVENTION

In order to solve the above-described problems, the present inventors made extensive and intensive investigations. As a result, it has been found that by regulating the content of an ethylene naphthalate unit in a layer having high refractive index characteristics to a specified range and using a copolymer polyester containing a specified monomer component for a layer having low refractive index characteristics, an improvement in interlayer adhesion can be realized while maintaining a certain level of polarization performance, leading to accomplishment of the present invention.

Namely, the object of the present invention is achieved by:
1. A uniaxially stretched multi-layer laminate film comprising a first layer and a second layer alternately laminated each other, wherein (1) the first layer is a layer containing a polyester, the polyester containing an ethylene naphthalate unit in an amount of 50 mol % or more and 100 mol % or less on a basis of a repeating unit that constitutes the polyester, and (2) a polymer that forms the second layer is a copolymer polyester containing, as copolymer components, a 2,6-naphthalenedicarboxylic acid component, an ethylene glycol component, and a trimethylene glycol component, (A) the content of an ethylene naphthalate unit in the polyester of the first layer being 80 mol % or more and 100 mol % or less on a basis of the repeating unit that constitutes the polyester, or (B) the polymer that forms the second layer being the copolymer polyester further containing, as a copolymer component, an alicyclic diol component.

In addition, the present invention includes the following embodiments.
2. A uniaxially stretched multi-layer laminate film comprising a first layer and a second layer alternately laminated each other, wherein (1) the first layer is a layer containing a polyester, the polyester containing an ethylene naphthalate unit in an amount of 80 mol % or more and 100 mol % or less on a basis of a repeating unit that constitutes the polyester, and (2) a polymer that forms the second layer is a copolymer polyester containing, as copolymer components, a 2,6-naphthalenedicarboxylic acid component, an ethylene glycol component, and a trimethylene glycol component.

3. The uniaxially stretched multi-layer laminate film as set forth in the above item 2, wherein the trimethylene glycol component is in an amount of 3 mol % to 50 mol % of the whole of diol components that constitute the copolymer polyester of the second layer, and a glass transition point of the copolymer polyester of the second layer is 85° C. or higher.

4. The uniaxially stretched multi-layer laminate film as set forth in the above item 2 or 3, wherein an average refractive index of the second layer is 1.55 or more and 1.65 or less.

5. The uniaxially stretched multi-layer laminate film as set forth in any of the above items 2 to 4, wherein the first layer has the content of an ethylene naphthalate unit in the polyester of 80 mol % or more and less than 100 mol % on a basis of a repeating unit that constitutes the polyester and further contains, as a dicarboxylic acid component, a terephthalic acid component in an amount of more than 0 mol % and 20 mol % or less.

6. A uniaxially stretched multi-layer laminate film comprising a first layer and a second layer alternately laminated each other, wherein (1) the first layer is a layer containing a polyester, the polyester containing an ethylene naphthalate unit in an amount of 50 mol % or more and 100 mol % or less on a basis of a repeating unit that constitutes the polyester, and (2) a polymer that forms the second layer is a copolymer polyester containing, as copolymer components, a 2,6-naphthalenedicarboxylic acid component, an ethylene glycol component, an alicyclic diol component, and a trimethylene glycol component.

7. The uniaxially stretched multi-layer laminate film as set forth in the above item 6, wherein the first layer has the content of an ethylene naphthalate unit in the polyester of 50 mol % or more and less than 100 mol % on a basis of a repeating unit that constitutes the polyester and further contains, as a dicarboxylic acid component, a component represented by the following formula (A) in an amount of more than 0 mol % and 50 mol % or less:

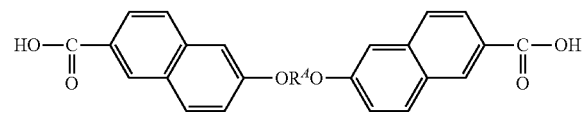

(A)

(in the formula (A), $R^A$ represents an alkylene group having 2 to 10 carbon atoms.)

8. The uniaxially stretched multi-layer laminate film as set forth in the above item 6, wherein the first layer has the content of an ethylene naphthalate unit in the polyester of 50 mol % or more and less than 100 mol % on a basis of a repeating unit that constitutes the polyester and further contains, as a dicarboxylic acid component, a component represented by the following formula (B) in an amount of more than 0 mol % and 50 mol % or less:

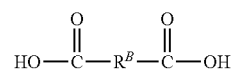

(B)

(in the formula (B), $R^B$ represents a biphenyl group.)

9. The uniaxially stretched multi-layer laminate film as set forth in any of the above items 6 to 8, wherein the alicyclic diol component is at least one member selected from spiro glycol, tricyclodecane dimethanol, and cyclohexane dimethanol.

10. The uniaxially stretched multi-layer laminate film as set forth in any of the above items 6 to 9, wherein the copolymer polyester that forms the second layer further contains a dicarboxylic acid component represented by the following formula (A):

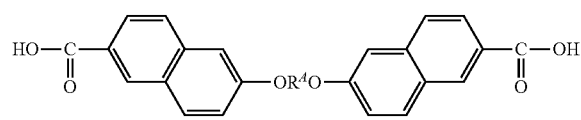

(A)

(in the formula (A), $R^A$ represents an alkylene group having 2 to 10 carbon atoms.)

11. The uniaxially stretched multi-layer laminate film as set forth in any of the above items 1 to 10, wherein a polarization degree (P) represented by the following equation (1) is 80% or more:

$$\text{Polarization degree}(P)=\{(Ts-Tp)/(Tp+Ts)\}\times 100 \quad (1)$$

(in the equation (1), Tp represents an average transmission for P-polarized light in a wavelength range of 400 to 800 nm, and Ts represents an average transmission for S-polarized light in a wavelength range of 400 to 800 nm.)

12. The uniaxially stretched multi-layer laminate film as set forth in any of the above items 1 to 11, wherein the number of lamination of the uniaxially stretched multi-layer laminate film is 101 layers or more.

13. The uniaxially stretched multi-layer laminate film as set forth in any of the above items 1 to 12, wherein a thick film layer composed of the composition of the second layer and having a thickness of 5 µm or more and 50 µm or less is provided on the both surface layers of the uniaxially stretched multi-layer laminate film.

14. The uniaxially stretched multi-layer laminate film as set forth in any of the above items 1 to 13, wherein a coating layer is provided at least on any one surface of outermost layers of the uniaxially stretched multi-layer laminate film, and the coating layer contains an acrylic binder.

15. The uniaxially stretched multi-layer laminate film as set forth in any of the above items 1 to 14, which is used as a brightness enhancement member or a reflection type polarizing plate.

16. An optical member comprising a prism layer or a diffusion layer on at least one surface of the uniaxially stretched multi-layer laminate film as set forth in any of the above items 1 to 15.

17. The uniaxially stretched multi-layer laminate film as set forth in any of the above items 1 to 14, which is used as a liquid crystal display polarizing plate adjacent to a liquid crystal cell.

18. A polarized plate for liquid crystal display comprising the uniaxially stretched multi-layer laminate film as set forth in any of the above items 1 to 14 and 17.

19. An optical member for liquid crystal display comprising a first polarizing plate composed of the polarized plate for liquid crystal display as set forth in the above item 18; and a second polarizing plate laminated in this order.

20. A liquid crystal display comprising a light source and the optical member for liquid crystal display as set forth in the above item 19, the first polarizing plate being disposed on the light source side.

DESCRIPTION OF EMBODIMENTS

Figure 1:
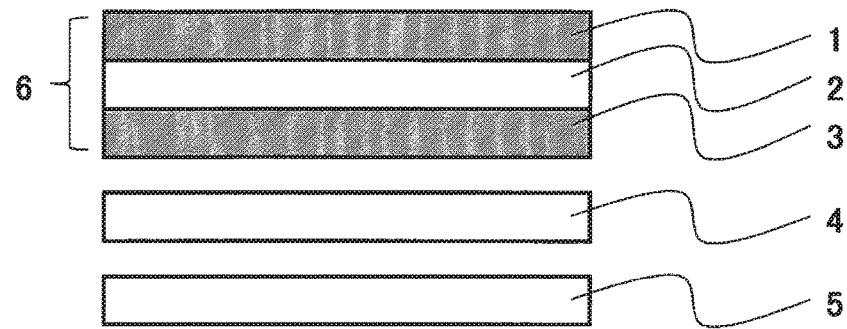
FIG. 1 is a diagrammatic cross-sectional view of a liquid crystal display according to a preferred embodiment of the present invention.
Figure 2:
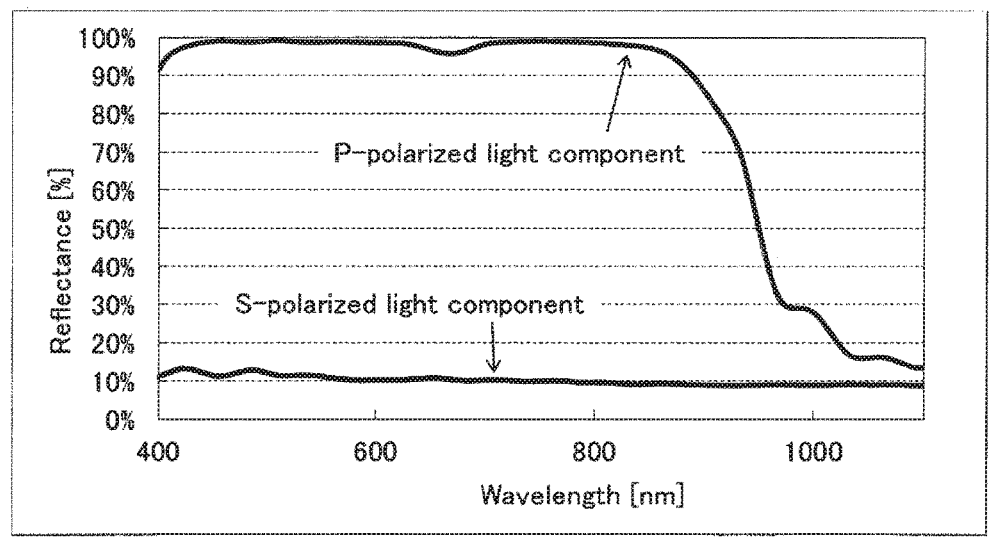
FIG. 2 shows an example of graphs that represent, against a wavelength, a reflectance of a polarized light component (P-polarized light component) parallel to the incident plane including a stretched direction (X direction) and a reflectance of a polarized light component (S-polarized light component) orthogonal to the incident plane including a stretched direction (X direction), while making the film plane of a uniaxially stretched multi-layer laminate film of the present invention as a reflection plane.

The uniaxially stretched multi-layer laminate film of the present invention is a uniaxially stretched multi-layer laminate film comprising a first layer and a second layer alternately laminated each other. Respective constitutions of the present invention, such as resins constituting respective layers, polarization performance, etc., are hereunder described in detail.

[Uniaxially Stretched Multi-Layer Laminate Film]

In the uniaxially stretched multi-layer laminate film of the present invention, the first layer is a layer having refractive index characteristics relatively higher than the second layer, and the second layer is a layer having refractive index characteristics relatively lower than the first layer. Such a relation of the refractive index is revealed by using the following polyester of a specified kind for each of the layers.

In addition, in the present invention, the uniaxial stretched direction is called an X direction, a direction orthogonal to the X direction in the film plane is called a Y direction, and a direction perpendicular to the film plane is called a Z direction.

The P-polarized light as referred to in the present invention is defined as a polarized light component parallel to the incident plane including the uniaxial stretched direction (X direction), while making the film plane of the uniaxially stretched multi-layer laminate film of the present invention as a reflection plane. In addition, the S-polarized light as referred to in the present invention is defined as a polarized light component perpendicular to the incident plane including the uniaxial stretched direction (X direction), while making the film plane of the uniaxially stretched multi-layer laminate film of the present invention as a reflection plane.

In the present invention, the refractive index in the stretched direction (X direction) is sometimes described as nX, the refractive index in the direction (Y direction) orthogonal to the stretched direction is sometimes described as nY, and the refractive index in the film thickness direction (Z direction) is sometimes described as nZ.

[First Layer]

The first layer that constitutes the uniaxially stretched multi-layer laminate film of the present invention contains a polyester containing an alkylene naphthalate unit. The alkylene naphthalate unit is, for example, an ethylene naphthalate unit. By using a polyester containing an alkylene naphthalate unit for the first layer that is a high refractive index layer and uniaxially stretching it, high stretching alignment birefringence is revealed, and with respect to the stretched direction (X direction), a difference in refractive index from the second layer can be made large, leading to contribution to high polarization of light.

Specifically, examples of the alkylene naphthalate unit include polyethylene-2,6-naphthalenedicarboxylate, polybutene-2,6-naphthalenedicarboxylate, polypropylene-2,6-naphthalenedicarboxylate, and copolymers thereof. Above all, a polyester composed of an ethylene-2,6-nnaphthalene dicarboxylate component as a main repeating unit, or a copolymer thereof is preferred.

Configuration of Film: First Embodiment
(Embodiment A)

Embodiment A: First Layer

The first layer that constitutes the uniaxially stretched multi-layer laminate film of the present invention is a layer containing a polyester. The polyester contains an ethylene naphthalate unit in an amount of 80 mol % or more and 100 mol % or less on a basis of the repeating unit that constitutes the polyester.

Embodiment A: First Dicarboxylic Acid Component

The polyester of the first layer contains, as a dicarboxylic acid component that constitutes the same, a naphthalenedicarboxylic acid component, and its content is 80 mol % or more and 100 mol % or less on a basis of the dicarboxylic acid component that constitutes the polyester. Examples of the naphthalenedicarboxylic acid component include 2,6-naphthalenedicarboxylic acid, 2,7-naphthalenedicarboxylic acid, and a component derived from a combination thereof, or a derivative component therefrom. In particular, 2,6-naphthalenedicarboxylic acid or a derivative component thereof is preferably exemplified. The lower limit value of the content of the naphthalenedicarboxylic acid component is preferably 85 mol %, and more preferably 90 mol %. In addition, the upper limit value of the content of the naphthalenedicarboxylic acid component is preferably less than 100 mol %, more preferably 98 mol % or less, and still more preferably 95 mol % or less.

By using the polyester containing a naphthalenedicarboxylic acid component as a main component, a high refractive index can be exhibited in the X direction, and at the same time, birefringence characteristics with high uniaxial alignment can be revealed, and with respect to the X direction, a difference in refractive index from the second layer can be made large, leading to contribution to high polarization of light. On the other hand, when the proportion of the naphthalenedicarboxylic acid component is below the lower limit value, amorphous characteristics become large, and in the stretched film, a difference between the refractive index nX in the stretched direction (X direction) and the refractive index nY in the Y direction becomes small, so that there might be a case where a sufficient reflection performance regarding the P-polarized light component is not obtained.

Embodiment A: Diol Component

As a diol component that constitutes the polyester of the first layer, an ethylene glycol component is used, and its content is preferably 80 mol % or more and 100 mol % or less, more preferably 85 mol % or more and 100 mol % or less, still more preferably 90 mol % or more and 100 mol % or less, and especially preferably 90 mol % or more and 98 wt % or less on a basis of the diol component that constitutes the polyester. When the proportion of the diol component is below the lower limit value, there might be a case where the above-described uniaxial alignment is impaired.

As the diol component that constitutes the polyester of the first layer, in addition to the ethylene glycol component, trimethylene glycol, tetramethylene glycol, cyclohexane dimethanol, diethylene glycol, or the like may further be contained within the range where the purpose of the present invention is not impaired.

Embodiment A: Second Dicarboxylic Acid Component

The polyester of the first layer may further contain, as the dicarboxylic acid component that constitutes the same, in addition to the naphthalenedicarboxylic acid component, a second dicarboxylic acid component, such as terephthalic acid, isophthalic acid, etc., within the range where the purpose of the present invention is not impaired. Above all, terephthalic acid is preferred. Its content is preferably more than 0 mol % and 20 mol % or less. In addition, the lower limit of the content of such a second dicarboxylic acid component is more preferably 2 mol %, and still more preferably 5 mol %, and the upper limit of the content of the second dicarboxylic acid component is more preferably 15 mol %, and still more preferably 10 mol %. When the proportion of the second dicarboxylic acid component is below the lower limit value, there might be a case where an effect for enhancing the interlayer adhesion is lowered; whereas when it is above the upper limit value, there is a tendency that it becomes difficult to make the difference in refractive index from the second layer large, and there might be a case where the polarization degree becomes low.

A melting point of the polyester that is used for the first layer is preferably 220 to 290° C., more preferably 230 to 280° C., and still more preferably 240 to 270° C. The melting point can be determined by means of measurement with DSC. When the melting point of the polyester is above the upper limit value, there might be a case where on the occasion of molding by means of melt extrusion, the fluidity is inferior, and the discharge or the like is liable to become non-uniform. On the other hand, when the melting point is below the lower limit value, though the film forming properties are excellent, the mechanical characteristics which the polyester has are liable to be impaired, and the refractive index characteristics of the present invention are hardly revealed.

A glass transition temperature (hereinafter sometimes referred to as "Tg") of the polyester that is used for the first layer is preferably 80 to 120° C., more preferably 82 to 118° C., still more preferably 85 to 118° C., and especially preferably 100 to 115° C. When the Tg falls within this range, the heat resistance and dimensional stability are excellent, and the refractive index characteristics of the present invention are readily revealed. Such melting point and glass transition temperature can be regulated by the kind and copolymerization amount of the copolymer components, control of diethylene glycol as a by-product, and the like.

By using such a polyester for the first layer and performing uniaxial stretching, with respect to the refractive index nX in the X direction of the first layer, high refractive index characteristics of 1.80 to 1.90 are revealed. When the refractive index in the X direction in the first layer falls within such a range, the difference in refractive index from the second layer becomes large, so that the reflective polarization performance can be exhibited.

In addition, a difference between the refractive index nY in the Y direction after uniaxial stretching and the refractive index nz in the Z direction after uniaxial stretching is preferably 0.5 or less.

Embodiment A: Second Layer

In the present embodiment in the present invention, it is necessary to use, as a polymer that forms the second layer of the uniaxially stretched multi-layer laminate film, a copolymer polyester containing, as copolymer components, a 2,6-naphthalenedicarboxylic acid component, an ethylene glycol component, and a trimethylene glycol component. The copolymer components in the present invention mean any of the components that constitute the polyester and are used including the main components without being limited to the copolymer components as a minor component.

In order to reveal the reflective polarization function, as the high refractive index layer of the present invention, the polyester composed of an ethylene naphthalate unit as a main component is used for the first layer, and when the polymer component of the second layer does not contain the 2,6-naphthalenedicarboxylic acid component, the compatibility with the first layer becomes low to cause interlayer exfoliation, and hence, the interlayer adhesion to the first layer is lowered.

In the present embodiment, in the copolymer polyester of the second layer, the diol component contains at least two components of an ethylene glycol component and a triethylene glycol component. Of these, from the viewpoint of film forming properties or the like, it is preferred that the ethylene glycol component is used as a main diol component. In addition, when the trimethylene glycol component is not contained, the elasticity of the layer structure is insufficient to cause interlayer exfoliation.

The content of such a 2,6-naphthalenedicarboxylic acid component is preferably 30 mol % to 100 mol %, more preferably 30 mol % to 80 mol %, and still more preferably 40 mol % or 70 mol % of the whole of carboxylic acid components that constitute the copolymer polyester of the second layer. When the content of the 2,6-naphthalenedicarboxylic acid component is below the lower limit, the interlayer adhesion tends to be lowered from the viewpoint of compatibility. Though the upper limit of the content of the 2,6-naphthalenedicarboxylic acid component is not particularly limited, in order to regulate the relation in refractive index with the first layer, the 2,6-naphthalenedicarboxylic acid component may be copolymerized with other dicarboxylic acid component.

The content of the ethylene glycol component is preferably 50 mol % to 95 mol %, more preferably 50 mol % to 90 mol %, still more preferably 50 mol % to 85 mol %, and especially preferably 50 mol % to 80 mol % of the whole of diol components that constitute the copolymer polyester of the second layer.

The content of the trimethyl glycol component is preferably 3 mol % to 50 mol %, more preferably 5 mol % to 40 mol %, still more preferably 10 mol % to 40 mol %, and especially preferably 10 mol % to 30 mol % of the whole of diol components that constitute the copolymer polyester of the second layer. When the content of the trimethylene glycol component is below the lower limit, it is difficult to ensure the interlayer adhesion; whereas when it is above the upper limit, there is a tendency that it becomes difficult to form a resin having desired refractive index and glass transition temperature.

An average refractive index of the copolymer polyester that constitutes the second layer is preferably 1.55 or more, more preferably 1.57 or more, still more preferably 1.59 or more, and especially preferably 1.60 or more. In addition, the average refractive index is preferably 1.65 or less, more preferably 1.64 or less, still more preferably 1.63 or less, and especially preferably 1.62 or less. In addition, it is preferred that the second layer is an optically isotropic layer.

The average refractive index regarding the second layer is a value obtained in the following manner. That is, the copolymer polyester that constitutes the second layer is melted alone and extruded from a die to prepare an unstretched film, which is then uniaxially stretched by 5.5 times at a temperature of {(glass transition temperature of the copolymer polyester of the second layer)+20° C.} to prepare a uniaxially stretched film; refractive indexes at a wavelength of 633 nm are measured in each of the X direction, the Y direction, and the Z direction of the obtained film using a prism coupler, manufactured by Metricon Corporation; and an average values thereof is prescribed as the average refractive index. In the present invention, the terms "optically isotropic" mean that the difference in refractive indexes between any two directions among the X direction, the Y direction, and the Z direction is 0.05 or less, and preferably 0.03 or less.

When the second layer is made of an optically isotropic material having such an average refractive index and having a small difference in refractive index in the respective directions by stretching, refractive index characteristics in which the difference in refractive index in the X direction after stretching between the first layer and the second layer are large, and at the same time, the refractive index characteristics in which the difference in refractive index between the layers in the Y direction is small can be obtained, and the polarization performance can be enhanced, and hence, such is preferred.

In the present invention, the second layer in the present embodiment may contain, as a second polymer component, a thermoplastic resin other than the foregoing copolymer polyester in an amount of 10 wt % or less on a basis of the weight of the second layer within the range where the purpose of the present invention is not impaired.

In the present embodiment in the present invention, the copolymer polyester of the second layer has a glass transition temperature of preferably 85° C. or higher, more preferably 90° C. or higher, and still more preferably 93° C. or higher. In addition, the glass transition temperature is preferably 150° C. or lower, more preferably 120° C. or lower, and still more preferably 110° C. or lower. When the glass transition temperature of the copolymer polyester of the second layer is lower than the lower limit, there might be a case where sufficient heat resistance at 90° C. is not obtained, and when a process, such as heat treatment in the neighborhood of the foregoing temperature, etc., is included, there might be a case where the haze is increased due to crystallization or embrittlement of the second layer, and a lowering of the polarization degree is followed. In addition, when the glass transition temperature of the copolymer polyester of the second layer is excessively high, there might be a case where at the time of stretching, the polyester of the second layer generates birefringence due to stretching, too. Following that, there might be a case where the difference in refractive index from the first layer becomes small in the stretched direction, whereby the reflection performance is lowered.

Among the above-described copolymer polyesters, an amorphous copolymer polyester is preferred from the standpoint that the increase of haze due to crystallization by the heat treatment at 90° C. for 1,000 hours does not occur at all. The term "amorphous" refers to the matter that at the time of raising the temperature at a temperature rise rate of 20° C./min in the differential scanning calorimetry (DSC), a crystal fusion heat is less than 0.1 mJ/mg.

Specific examples of the copolymer polyester of the second layer include (1) a copolymer polyester containing, as the dicarboxylic acid component, a 2,6-naphthalenedicarboxylic acid component and, as the diol component, an ethylene glycol component and a trimethylene glycol component; and (2) a copolymer polyester containing, as the dicarboxylic acid component, a 2,6-naphthalenedicarboxylic acid component and a terephthalic acid component and, as the diol component, an ethylene glycol component and a trimethylene glycol component.

In the present embodiment, the copolymer polyester of the second layer has an intrinsic viscosity, as measured at 35° C. using an o-chlorophenol solution, of preferably 0.50 to 0.70 dL/g, and more preferably 0.55 to 0.65 dL/g. In the present embodiment, the copolymer polyester of the second layer uses, as the copolymer component, a trimethylene glycol component, and therefore, there might be a case where the film forming properties are lowered. By regulating the intrinsic viscosity of the copolymer polyester to the above-described range, the film forming properties can be more enhanced. It is preferred that the intrinsic viscosity in the case of using the above-described copolymer polyester as the second layer is higher from the viewpoint of film forming properties. However, in the range where the intrinsic viscosity is above the upper limit, the difference in melt viscosity from the polyester of the first layer becomes large, so that there might be a case where the thickness of each layer is liable to become non-uniform.

Configuration of Film: Second Embodiment
(Embodiment B)

Embodiment B: First Layer

The first layer that constitutes the uniaxially stretched multi-layer laminate film of the present invention is a layer containing a polyester. The polyester contains an ethylene naphthalate unit in an amount of 50 mol % or more and 100 mol % or less on a basis of the repeating unit that constitutes the polyester.

Embodiment B: First Dicarboxylic Acid Component

The polyester of the first layer contains, as a dicarboxylic acid component that constitutes the same, a naphthalenedicarboxylic acid component, and its content is 50 mol % or more and 100 mol % or less on a basis of the dicarboxylic acid component that constitutes the polyester. The naphthalenedicarboxylic acid component is the same as in Embodiment A. The lower limit value of the content of the naphthalenedicarboxylic acid component is preferably 55 mol %, more preferably 60 mol %, and still more preferably 65 mol %. In addition, the upper limit value of the content of the naphthalenedicarboxylic acid component is preferably less than 100 mol %, more preferably 95 mol % or less, still more preferably 90 mol % or less, especially preferably 80 mol % or less, and most preferably 70 mol % or less.

The effects to be brought by using the polyester containing the naphthalenedicarboxylic acid component as a main component are the same as in Embodiment A.

Embodiment B: Diol Component

As a diol component that constitutes the polyester of the first layer, an ethylene glycol component is used, and its content is preferably 50 mol % or more and 100 mol % or less, more preferably 75 mol % or more and 100 mol % or less, still more preferably 90 mol % or more and 100 mol % or less, and especially preferably 90 mol % or more and 98 wt % or less on a basis of the diol component that constitutes the polyester. When the proportion of the diol component is below the lower limit value, there might be a case where the above-described uniaxial alignment is impaired.

As the diol component that constitutes the polyester of the first layer, in addition to the ethylene glycol component, trimethylene glycol, tetramethylene glycol, cyclohexane dimethanol, diethylene glycol, or the like may further be contained within the range where the purpose of the present invention is not impaired.

Embodiment B: Second Dicarboxylic Acid Component

It is preferred that a second dicarboxylic acid component is further used for the polyester that constitutes the first layer, and it is preferred to contain a component represented by the following formula (A) in an amount of more than 0 mol % and 50 mol % or less, or to contain a component represented by the following formula (B) in an amount of more than 0 mol % and 50 mol % or less.

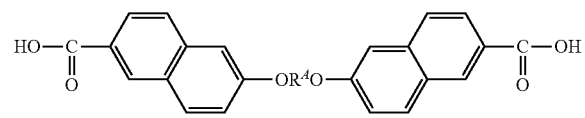

(A)

(In the formula (A), $R^4$ represents an alkylene group having 2 to 10 carbon atoms.)

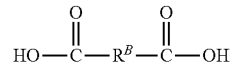

(B)

(In the formula (B), $R^B$ represents a biphenyl group.)

As for the content of the second dicarboxylic acid component, the lower limit is preferably 5 mol %, more preferably 10 mol %, still more preferably 20 mol %, and especially preferably 30 mol % on a basis of the dicarboxylic acid component constituting the polyester of the first layer. In addition, the upper limit of the content of the second dicarboxylic acid component is preferably 45 mol %, more preferably 40 mol %, and still more preferably 35 mol %.

An aromatic polyester (I) (hereinafter sometimes referred to as "aromatic polyester (I)") further containing the component represented by the following formula (A) and an aromatic polyester (II) (hereinafter sometimes referred to as "aromatic polyester (II)") further containing the component represented by the following formula (B) are hereunder described.

(Aromatic Polyester (I))

As one of the polyesters that form the first layer, an aromatic polyester (I) having an aromatic copolymer component of the following specified structure in the dicarboxylic acid component thereof is exemplified.

In the present invention, as a preferred example of the dicarboxylic acid component that constitutes the aromatic polyester (I), it is preferred to contain specified amounts of 50 mol % or more and less than 100 mol % of the naphthalenedicarboxylic acid and more than 0 mol % and 50 mol % or less of the component represented by the following formula (A).

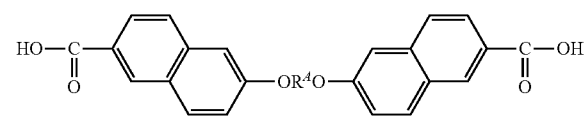

(A)

(In the formula (A), $R^4$ represents an alkylene group having 2 to 10 carbon atoms.)

By using the polyester containing such copolymer components, the polarization performance can be more enhanced. On the other hand, when the proportion of the component represented by the formula (A) is above the upper limit value, the amorphous characteristics become large, and in the stretched film, a difference between the refractive index nX in the X direction and the refractive index nY in the Y direction tends to become small. Therefore, there is a tendency that it becomes difficult to make the difference in refractive index between the layers of the first layer and the second layer in the X direction large, and there might be a case where a sufficient reflection performance regarding the P-polarized light component is not obtained.

With respect to the component represented by the formula (A), in the formula, $R^4$ represents an alkylene group having 2 to 10 carbon atoms. Examples of such an alkylene group include an ethylene group, a trimethylene group, an isopropylene group, a tetramethylene group, a hexamethylene group, an octamethylene group, and the like, with an ethylene group being especially preferred.

The lower limit value of the content of the component represented by the formula (A) is preferably 5 mol %, more preferably 10 mol %, still more preferably 20 mol %, and especially preferably 30 mol %. In addition, the upper limit value of the content of the component represented by the formula (A) is more preferably 45 mol %, still more preferably 40 mol %, and especially preferably 35 mol %.

As the acid component represented by the formula (A), a component derived from 6,6'-(ethylenedioxy)di-2-naphthoic acid, 6,6'-(trimethylenedioxy)di-2-naphthoic acid, or 6,6'-(butylenedioxy)di-2-naphthoic acid is preferred. Of those, components in which the carbon atom number of $R^A$ in the formula (A) is an even number are preferred, and a component derived from 6,6'-(ethylenedioxy)di-2-naphthoic acid is especially preferred.

In the present invention, as an embodiment of the preferred aromatic polyester (I), a polyester in which the naphthalenedicarboxylic acid component is a component derived from 2,6-naphthalenedicarboxylic acid, the dicarboxylic acid component represented by the formula (A) is a component derived from 6,6'-(ethylenedioxy)di-2-naphthoic acid, and the diol component is ethylene glycol is especially preferred.

A component, such as the naphthalene dicarboxylic acid component, the component represented by the formula (A), etc., having an aromatic ring mainly influences attainment of a high refractive index in the X direction through stretching. In addition, when the component represented by the formula (A) is contained, the refractive index in the Y direction tends to be easily lowered by stretching. Specifically, the component represented by the formula (A) has a molecular structure in which two aromatic rings are bonded to each other by ether bonding through an alkylene chain, so that these aromatic rings easily rotate in a direction different from the plane direction when the film is uniaxially stretched, and the refractive index in the Y direction of the first layer is easily lowered by stretching. On the other hand, since the diol component of the aromatic polyester (1) in the present invention is aliphatic, the influence of the diol component on the refractive index characteristics of the first layer is less as compared with the dicarboxylic acid component of the present invention.

The aromatic polyester (I) has an intrinsic viscosity, as measured at 35° C. using a mixed solvent of p-chlorophenol/1,1,2,2-tetrachloroethane (weight ratio: 40/60), of preferably 0.4 to 3 dL/g, more preferably 0.4 to 1.5 dL/g, and especially preferably 0.5 to 1.2 dL/g.

A melting point of the aromatic polyester (I) is preferably 200 to 260° C., more preferably 205 to 255° C., and more preferably 210 to 250° C. The melting point can be determined by means of measurement with DSC. When the melting point of the polyester is above the upper limit value, on the occasion of molding by means of melt extrusion, the fluidity tends to be inferior, and there might be a case where the discharge or the like is liable to become non-uniform. On the other hand, when the melting point is below the lower limit value, though the film forming properties are excellent, the mechanical characteristics which the polyester has are liable to be impaired, and the refractive index characteristics of the present invention are hardly revealed.

In general, a copolymer has a lower melting point as compared with a homopolymer, and the mechanical strength thereof tends to be lowered. However, in the case of a copolymer containing the naphthalene dicarboxylic acid component and the component of the formula (A), the copolymer exhibits such excellent performances that it exhibits a mechanical strength comparable to that of a homopolymer containing only the naphthalene dicarboxylic acid component or a homopolymer containing only the component of the formula (A), although the melting point is lower than that of the homopolymers.

A glass transition temperature (hereinafter sometimes referred to as "Tg") of the aromatic polyester (I) is preferably 80 to 120° C., more preferably 82 to 118° C., and still more preferably 85 to 118° C. When the Tg falls within this range, a film having excellent heat resistance and dimensional stability is readily revealed. Such melting point and glass transition temperature can be regulated by the kind and copolymerization amount of the copolymer components, control of diethylene glycol as a by-product, and the like.

Figure 4:
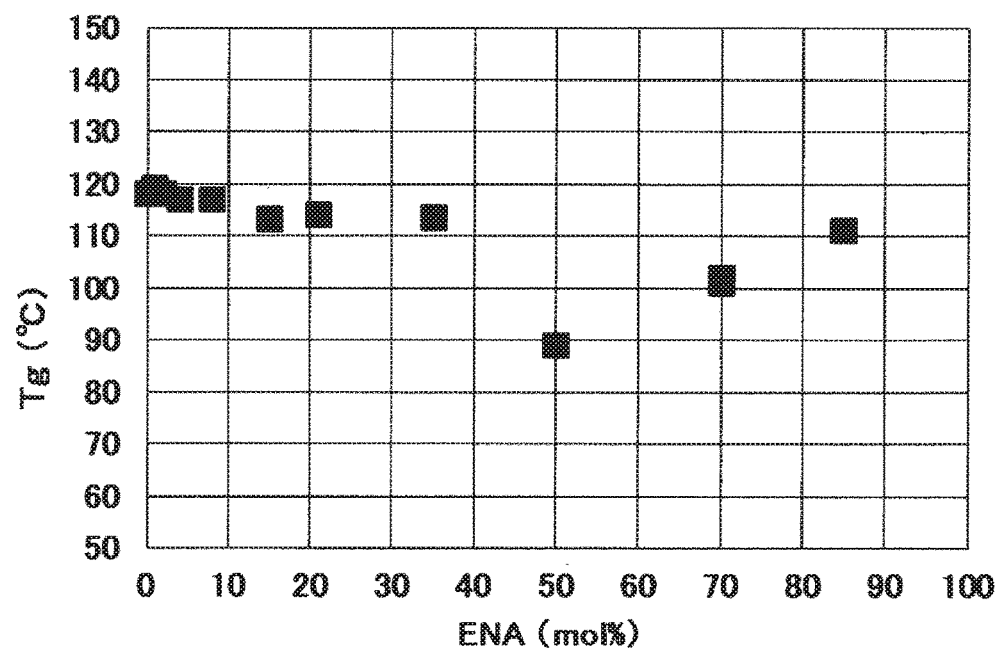
FIG. 4 shows a glass transition point (Tg) regarding a copolymer polyester in which a dicarboxylic acid component is composed of a component derived from 2,6-naphthalenedicarboxylic acid and 6,6'-(ethylenedioxy)di-2-naphthoic acid (ENA), and a diol component is ethylene glycol, when a ratio of the dicarboxylic acid component is changed.
Figure 5:
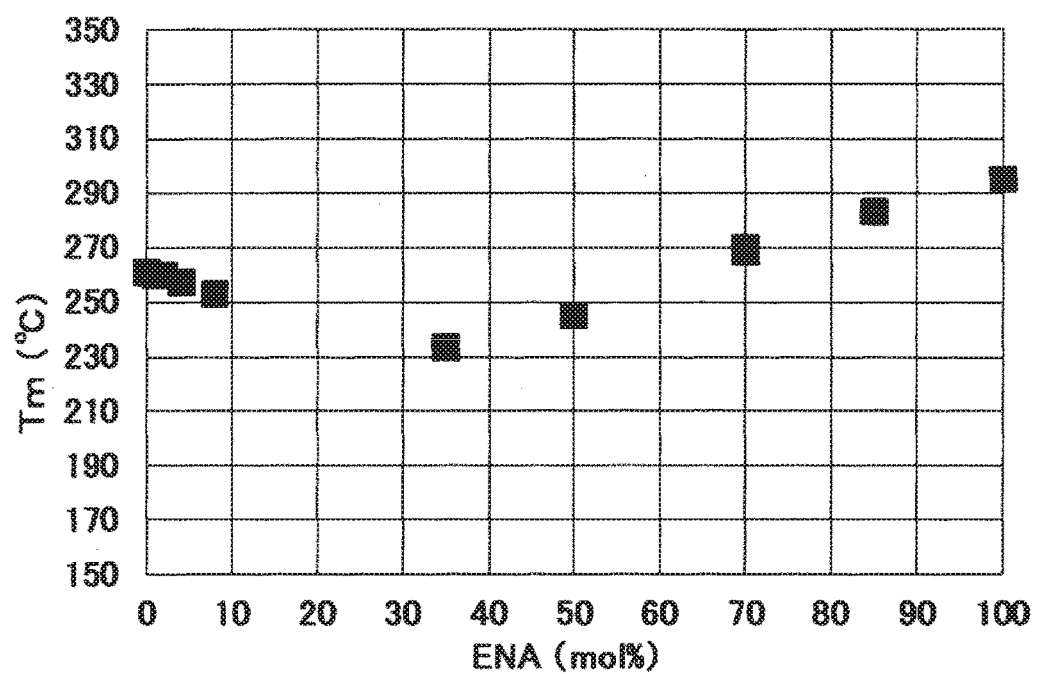
FIG. 5 shows a melting point (Tm) regarding a copolymer polyester in which a dicarboxylic acid component is composed of a component derived from 2,6-naphthalenedicarboxylic acid and 6,6'-(ethylenedioxy)di-2-naphthoic acid (ENA), and a diol component is ethylene glycol, when a ratio of the dicarboxylic acid component is changed.

With respect to the polyester in which the naphthalenedicarboxylic acid component is a component derived from 2,6-naphthalenedicarboxylic acid, the dicarboxylic acid component represented by the formula (A) is a component derived from 6,6'-(ethylenedioxy)di-2-naphthoic acid, and the diol component is ethylene glycol, the glass transition point and the melting point in the case of changing the ratio of the dicarboxylic acid component are shown in FIGS. 4 and 5, respectively.

As to the production method of the aromatic polyester (I) in the case of containing the naphthalenedicarboxylic acid component and the component represented by the formula (A), the aromatic polyester (I) can be produced in conformity with the method described on page 9 of WO2008/153188.

(Refractive Index Characteristics of Aromatic Polyester (I))

When the aromatic polyester (I) containing such specified copolymer components is used for the first layer and uniaxially stretched, the refractive index nX in the X direction of the first layer has high refractive index characteristics of 1.80 to 1.90. When the refractive index in the X direction in the first layer falls within such a range, the difference in refractive index from the second layer becomes large, so that a sufficient reflective polarization performance can be exhibited.

In addition, a difference between the refractive index nY in the Y direction after uniaxial stretching and the refractive index nz in the Z direction after uniaxial stretching is preferably 0.5 or less.

(Aromatic Polyester (II))

As the polyester that constitutes the first layer of the present invention, in addition to the aromatic polyester (I), an embodiment of the following aromatic polyester (II) is also preferably exemplified.

Specifically, there is exemplified an aromatic polyester in which a component represented by the following formula (B) is used as the dicarboxylic acid component in place of the component represented by the formula (A) of the aromatic polyester (I) and contained in an amount of more than 0 mol % and 50 mol % or less.

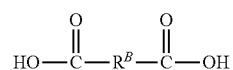

(B)

(In the formula (B), $R^B$ represents a biphenyl group.)

Of the dicarboxylic acid component and the diol component that constitute the aromatic polyester (II), as the constitution other than the component represented by the formula (B), the same components as in the aromatic polyester (I) can be used, and their contents follow those in the aromatic polyester (I).

Embodiment B: Second Layer

In the present embodiment in the present invention, it is necessary to use, as a polymer that forms the second layer of the uniaxially stretched multi-layer laminate film, a copolymer polyester containing, as copolymer components, a 2,6-naphthalenedicarboxylic acid component, an ethylene glycol component, an alicyclic diol component, and a trimethylene glycol component. The copolymer components in the present invention mean any of the components that constitute the polyester and are used including the main components without being limited to the copolymer components as a minor component.

In order to reveal the reflective polarization function, as the high refractive index layer of the present invention, the polyester containing a predetermined amount of an ethylene naphthalate unit is used for the first layer, and when the polymer component of the second layer does not contain the 2,6-naphthalenedicarboxylic acid component, the compatibility with the first layer becomes low to cause interlayer exfoliation, and hence, the interlayer adhesion to the first layer is lowered.

In the present embodiment, in the copolymer polyester of the second layer, the diol component contains at least three components of an ethylene glycol component, an alicyclic diol component, and a triethylene glycol component. Of these, from the viewpoint of film forming properties or the like, it is preferred that the ethylene glycol component is used as a main diol component. In addition, when the trimethylene glycol component is not contained, the elasticity of the layer structure is insufficient to cause interlayer exfoliation. Furthermore, when the alicyclic diol component is contained, in particular, it becomes possible to make a difference in refractive index between the layers smaller according to the refractive index characteristics of the first layer in the Y direction small, and the polarization performance can be enhanced. Simultaneously, a glass transition point at which the sufficient heat resistance may be revealed can be obtained. As such an alicyclic diol component, at least one member selected from spiro glycol, tricyclodecane dimethanol, and cyclohexane dimethanol is preferably exemplified.

The content of such a 2,6-naphthalenedicarboxylic acid component is preferably 30 mol % to 100 mol %, and more preferably 30 mol % to 80 mol % of the whole of carboxylic acid components that constitute the copolymer polyester of the second layer. When the content of the 2,6-naphthalenedicarboxylic acid component is below the lower limit, the interlayer adhesion tends to be lowered from the viewpoint of compatibility. Though the upper limit of the content of the 2,6-naphthalenedicarboxylic acid component is not particularly limited, in order to regulate the relation in refractive index with the first layer, the 2,6-naphthalenedicarboxylic acid component may be copolymerized with other dicarboxylic acid component.

The content of the ethylene glycol component is preferably 50 mol % to 92 mol %, and more preferably 50 mol % to 80 mol % of the whole of diol components that constitute the copolymer polyester of the second layer.

The content of the alicyclic diol component is preferably 3 mol % to 40 mol %, and more preferably 3 mol % to 30 mol % of the whole of diol components that constitute the copolymer polyester of the second layer. When the content of the alicyclic diol component is below the lower limit, it is difficult to form a resin having desired refractive index and glass transition point; whereas when it is above the upper limit, it becomes difficult to ensure the adhesion.

The content of the trimethyl glycol component is preferably 5 mol % to 47 mol %, and 10 mol % to 40 mol % of the whole of diol components that constitute the copolymer polyester of the second layer. When the content of the trimethylene glycol is below the lower limit, it is difficult to ensure the interlayer adhesion; whereas when it is above the upper limit, there is a tendency that it becomes difficult to form a resin having desired refractive index and glass transition point.

An average refractive index of the copolymer polyester that constitutes the second layer is preferably 1.50 or more, more preferably 1.53 or more, still more preferably 1.55 or more, and especially preferably 1.58 or more. In addition, the average refractive index is preferably 1.65 or less, more preferably 1.63 or less, still more preferably 1.61 or less, and especially preferably 1.60 or less. In addition, it is preferred that the second layer is an optically isotropic layer.

The average refractive index regarding the second layer is a value obtained in the following manner. That is, the copolymer polyester that constitutes the second layer is melted alone and extruded from a die to prepare an unstretched film, which is then uniaxially stretched by 5 times at a temperature of {(glass transition temperature of the copolymer polyester of the second layer)+20° C.} to prepare a uniaxially stretched film; refractive indexes at a wavelength of 633 nm are measured in each of the X direction, the Y direction, and the Z direction of the obtained film using a prism coupler, manufactured by Metricon Corporation; and an average values thereof is prescribed as the average refractive index. The definition of the terms "optically isotropic" is the same as in Embodiment A.

When the second layer is made of an optically isotropic material having such an average refractive index and having a small difference in refractive index in the respective directions by stretching, refractive index characteristics in which the difference in refractive index in the X direction after stretching between the first layer and the second layer are large, and at the same time, the refractive index characteristics in which the difference in refractive index between the layers in the Y direction is small can be obtained, and the polarization performance can be enhanced, and hence, such is preferred.

Furthermore, in the case of using, as the copolymer component of the first layer, the component represented by the formula (A) or formula (B), not only the above-described characteristics of the X direction and the Y direction regarding the difference in refractive index between the respective directions but also the difference in refractive index in the Z direction becomes small, and furthermore, a hue shift caused by an oblique incident angle can be reduced, and hence, such is preferred.

In the present invention, the second layer in the present embodiment may contain, as a second polymer component, a thermoplastic resin other than the foregoing copolymer polyester in an amount of 10 wt % or less on a basis of the weight of the second layer within the range where the purpose of the present invention is not impaired.

In the present embodiment in the present invention, the copolymer polyester of the second layer has a glass transition point of preferably 70° C. or higher, and more preferably 75° C. or higher. In addition, the glass transition point is preferably 150° C. or lower, more preferably 120° C. or lower, and still more preferably 110° C. or lower. When the glass transition point of the copolymer polyester of the second layer is lower than the lower limit, there might be a case where sufficient heat resistance is not obtained, and when a process, such as heat treatment in the neighborhood of the glass transition point or at a higher temperature, etc., is included, there might be a case where the haze is increased due to crystallization or embrittlement of the second layer, and a lowering of the polarization degree is followed. In addition, when the glass transition point of the copolymer polyester of the second layer is excessively high, there might be a case where at the time of stretching, the polyester of the second layer generates birefringence due to stretching, too. Following that, there might be a case where the difference in refractive index from the first layer becomes small in the stretched direction, whereby the reflection performance is lowered.

Among the copolymer polyesters having such refractive index characteristics, an amorphous copolymer polyester is preferred from the standpoint that the increase of haze due to crystallization by the heat treatment does not occur at all. The definition of the term "amorphous" is the same as in Embodiment A.

Specific examples of the copolymer polyester of the second layer include (1) a copolymer polyester containing, as the dicarboxylic acid component, a 2,6-naphthalenedicarboxylic acid component and, as the diol component, an ethylene glycol component, a trimethylene glycol component, and a spiro glycol component; and (2) a copolymer polyester containing, as the dicarboxylic acid component, a 2,6-naphthalenedicarboxylic acid component and a terephthalic acid component and, as the diol component, an ethylene glycol component, a trimethylene glycol component, and a spiro glycol component. In addition to the above-described copolymer components, a copolymer polyester further containing, as the dicarboxylic acid component, a component represented by the following formula (A) is preferably exemplified.

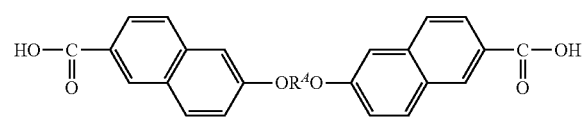

(A)

(In the formula (A), $R^4$ represents an alkylene group having 2 to 10 carbon atoms.)

Examples of such an alkylene group include an ethylene group, a trimethylene group, an isopropylene group, a tetramethylene group, a hexamethylene group, an octamethylene group, and the like, with an ethylene group being especially preferred.

In the present embodiment, the copolymer polyester of the second layer has an intrinsic viscosity, as measured at 35° C. using an o-chlorophenol solution, of preferably 0.55 to 0.75 dL/g, and more preferably 0.60 to 0.70 dL/g. In the present embodiment, the copolymer polyester of the second layer uses, as the copolymer components, an alicyclic diol component and the like, and therefore, there might be a case where the tearing strength in an unstretched direction is lowered. By regulating the intrinsic viscosity of the copolymer polyester to the above-described range, the tearing resistance can be enhanced. It is preferred that the intrinsic viscosity in the case of using the above-described copolymer polyester as the second layer is higher from the viewpoint of tearing resistance. However, in the range where the intrinsic viscosity is above the upper limit, the difference in melt viscosity from the aromatic polyester of the first layer becomes large, so that there might be a case where the thickness of each layer is liable to become non-uniform.

Configuration of Film: Other Embodiment

In the present invention, the following embodiment is also disclosed.

Other Embodiment: First Layer

As an embodiment of the first layer in the present embodiment, the above-described embodiments of the first layer are preferably exemplified. The embodiment of the first layer in Embodiment B is more preferred.

Other Embodiment: Second Layer

In the present embodiment in the present invention, as the polymer that forms the second layer of the uniaxially stretched multi-layer laminate film, a copolymer polyester having a glass transition point of 90° C. or higher and an average refractive index of 1.55 to 1.65 is preferably used.

The glass transition point (Tg) of the copolymer polyester that forms the second layer is preferably 90° C. or higher and lower than 120° C. When the glass transition point of such a copolymer polyester is lower than the lower limit, deformation, fusion, and the like are generated at an actually used temperature of a liquid crystal display or the like, and the copolymer polyester tends to be hardly put into practical use. On the other hand, in the present embodiment, the upper limit of the glass transition point of the copolymer polyester is not particularly limited within the range where the purpose of the present invention is not impaired. However, when the glass transition point of the copolymer polyester that is used for the second layer having low refractive index characteristics is 120° C. or higher, alignment is liable to be generated in the stretching process, and there is a tendency that it becomes difficult to obtain the target refractive index characteristics.

In addition, in the present embodiment, an average refractive index of the copolymer polyester that forms the second layer is preferably 1.55 to 1.65, and more preferably 1.58 or more and 1.60 or less. The average refractive index of the copolymer polyester of the second layer is regulated so as conform to the refractive index in a direction (Y direction) orthogonal to the stretched direction of the first layer polyester. In addition, it is preferred that the copolymer polyester of the second layer is optically isotropic. The definition of the terms "optically isotropic" is the same as in Embodiment A.

When the second layer is made of an optically isotropic material having such an average refractive index and having a small difference in refractive index in the respective directions by stretching, refractive index characteristics in which the difference in refractive index in the X direction after stretching between the first layer and the second layer are large, and at the same time, the refractive index characteristics in which the difference in refractive index between the layers in the Y direction is small can be obtained, and the polarization performance can be enhanced, and hence, such is preferred.

<Characteristics of Film>
(Polarization Degree)

In the uniaxially stretched multi-layer laminate film of the present invention, a polarization degree (P) represented by the following equation (1) is preferably 80% or more, and more preferably 85% or more. Furthermore, the polarization degree (P) is preferably 90.0% or more, more preferably 95.0% or more, still more preferably 99.0% or more, especially preferably 99.5% or more, and most preferably 99.9% or more.

$$\text{Polarization degree}(P)=\{(Ts-Tp)/(Tp+Ts)\}\times 100 \quad (1)$$

(In the equation (1), Tp represents an average transmission for P-polarized light in a wavelength range of 400 to 800 nm, and Ts represents an average transmission for S-polarized light in a wavelength range of 400 to 800 nm.)

In the present invention, the polarization degree can be measured using a polarization degree measurement device.

It is meant that as the polarization degree specified by the above equation (1) is higher, transmission of the reflected polarized light component is suppressed, and transmittance of the transmitted polarized light component in a direction orthogonal thereto is higher. That is, as the polarization degree increases, even a slight light leakage of the reflected polarized light component can be reduced. When the uniaxially stretched multi-layer laminate film of the present invention has such a polarization degree, it can be preferably used for applications which reflective polarization characteristics are required, such as brightness enhancement members, etc. In addition, when the uniaxially stretched multi-layer laminate film of the present invention has a polarization degree of 99.5% or more, it can be applied as a reflective polarizing plate by itself as a polarizing plate to a high contrast liquid crystal display device to which only an absorption type polarizing plate is applicable so far.

Such polarization degree characteristics can be obtained by using polymers of the above-described kinds as the polymers that constitute the first layer and the second layer and regulating the interlayer refractive indexes in the X direction, Y direction, and Z direction by uniaxial stretching. Furthermore, for the purpose of obtaining a high polarization degree of 99.5% or more, by adopting the above-described Embodiment B as the embodiment, using the aromatic polyester (I) or aromatic polyester (II) among the polyesters of the first layer, regulating the amount of the second dicarboxylic acid component of these polyesters to 10 mol % or more, and further performing toe-out (re-stretching) and heat fixing treatment within a predetermined range after uniaxial stretching, alignment characteristics of the uniaxially stretched multi-layer laminate film can be controlled in a high level, and such a high polarization degree is obtained.

(Average Transmittance for S-Polarized Light)

An average transmittance Ts for S-polarized light of the uniaxially stretched multi-layer laminate film of the present invention in a wavelength range of 400 to 800 nm is preferably 60% or more, more preferably 70% or more, still more preferably 75% or more, and especially preferably 80% or more. The average transmittance for S-polarized light in the present invention represents an average transmittance in a wavelength range of 400 nm to 800 nm for a polarized light component perpendicular to an incident plane including the uniaxially stretched direction (X direction) with respect to incident polarized light entering at an incident angle of zero degree, wherein the film plane of the uniaxially stretched multi-layer laminate film is made as a reflection plane.

When the average transmittance for S-polarized light is below the lower limit, even though an optical recycle function is taken into consideration in the case of being used for a brightness enhancement member, a reflective polarizing plate, a reflective polarizing plate, or the like, superiority in brightness enhancing effect becomes diminished as compared with an absorption type polarizing plate. The optical recycle function is a characteristic of the reflective polarizing plate, in which reflected polarized light component is not absorbed by a polarizing plate, but reflected to the side of a light source so as to use the light again efficiently.

<Laminate Configuration of Film>

[Intermediate Layer and Outermost Layer (Thick Film Layer)]

The uniaxially stretched multi-layer laminate film of the present invention may, in addition to such first layer and second layer, include an intermediate layer and/or an outermost layer. The intermediate layer and/or the outermost layer has a layer thickness of preferably 2 µm or more, more preferably 5 µm or more, and still more preferably 7 µm or more, and preferably 50 µm or less, more preferably 45 µm or less, still more preferably 30 µm or less, especially preferably 20 µm or less, and most preferably 15 µm or less. Such an intermediate layer may be disposed in the interior of the alternately laminated configuration of the first layer and the second layer. In the first embodiment (Embodiment A), the thickness of the intermediate layer and/or the outermost layer is preferably 5 µm or more and 50 µm or less. In addition, in the second embodiment (Embodiment B), the thickness of the intermediate layer and/or the outermost layer is preferably 2 µm or more and 30 µm or less.

In the present invention, an embodiment in which the outermost layer composed of the second layer having a thickness falling within the above-described range is disposed can be exemplified as a preferred embodiment. By adopting this and a coating layer as described later, the adhesion to the prism layer can be more enhanced. When the thickness of the outermost layer composed of the second layer is below the lower limit, the adhesion between the prism layer and the uniaxially stretched multi-layer laminate film tends to become low, and exfoliation of the prism layer tends to be liable to be caused. From the viewpoint of production as well as the viewpoint of thinning of the entirety of the uniaxially stretched multi-layer laminate film, it is preferred to regulate the upper limit of the thickness of the outermost layer within the above-described range.

In the present invention, as for a mechanism in which the second layer having a certain level of thickness is disposed as the outermost layer to more enhance the adhesion to the prism layer, the outermost layer composed of the second layer gives rise to a cushioning effect, and a part of the stress applied onto an interface between the prism layer and the uniaxially stretched multi-layer laminate film is relieved, and hence, it may be considered that such contributes to an enhancement of the prism adhesion. When the thickness of the outermost layer is below the lower limit, such an effect is not sufficiently revealed.

In the present invention, while the intermediate layer is sometimes referred to as an inside thick film layer or the like, it refers to a thick film layer disposed inside the alternately laminated configuration in the present invention. In the present invention, in a preferred method, a thick film layer (sometimes referred to "thickness conditioning layer" or "buffer layer") is formed on the both sides of an alternate laminate consisting of 101 layers or more or 300 layers or less in an initial step of producing a multi-layer laminate film, and the number of lamination is then increased by doubling. In that case, a method in which two buffer layers are laminated with each other to form the intermediate layer is preferred. The thick film layer on the outermost side as obtained by such a method is referred to as an outermost layer (or a thick film layer) in place of the intermediate layer.

In the case where the intermediate layer having such a thickness is included in a part of the alternately laminated configuration of the first layer and the second layer, it is easy to regulate uniformly the thickness of each of the layers that constitute the first layer and the second layer without affecting the polarization function. The intermediate having such a thickness may have the same composition as in either the first layer or the second layer, or a composition that partly contains the same composition. The layer thickness is so thick that it does not contribute to the refractive characteristics. On the other hand, the transmitted polarized light is sometimes affected, so that when particles are included in the layer, they are preferably included in the range of the particle concentration described in the explanation of particles.

When the thickness of the intermediate layer is below the lower limit, there might be a case where disturbance in the layer configuration of the alternately laminated configuration is generated, and there might be a case where the reflection performance is sometimes lowered. On the other hand, when the thickness of the intermediate layer is above the upper limit, the thickness of the entirety of the uniaxially stretched multi-layer laminate film after lamination becomes thick, so that in the case of using it for a polarizing plate of a thin-type liquid crystal display (liquid crystal display device) or a brightness enhancement member, there might be a case where it is difficult to attain space-saving. In addition, in the case of including plural intermediate layers within the uniaxially stretched multi-layer laminate film, it is preferred that the thickness of each of the intermediate layers falls within such a range.

Furthermore, in the case where the thick film layer (outermost layer) composed of the composition of the second layer and having the above-described thickness is disposed on the both surface layer of the uniaxially stretched multi-layer laminate film, the outermost layer having a glass transition point relatively lower than that in the first layer functions as a cushioning material, is able to relieve a part of the external stress against the uniaxially stretching multi-layer laminate film, and furthermore, is able to suppress the interlayer exfoliation, and hence, such is preferred.

As for the polymer that is used for the intermediate layer, a resin different from that in the first layer or second layer may be used so long as it can be made present in the multi-layer structure adopting the production method of a uniaxially stretched multi-layer laminate film of the present invention. However, from the viewpoint of interlayer adhesiveness, it is preferred that the polymer that is used for the intermediate layer has the same composition as in either the first layer or the second layer, or a composition that partly contains the same composition.

The method of forming the intermediate layer is not particularly limited. However, for example, as described in the section of the production method of the uniaxially stretched multi-layer laminate layer, one inside thick film layer (intermediate layer) can be provided in such a manner that a thick film layer (buffer layer) is provided on the both sides of an alternately laminated body before performing doubling, and the resulting assembly is divided into two parts by using a branching block called as a layer doubling block, followed by again lamination. By adopting the same technique, a plurality of intermediate layers can also be provided through three branching or four branching.

[Laminate Configuration of Uniaxially Stretched Multi-Layer Laminate Film]
(Number of Lamination)

In the uniaxially stretched multi-layer laminate film of the present invention, the above-described first layer and second layer are alternately laminated in a total number of lamination of preferably 101 layers or more, and more preferably 251 layers or more. When the number of lamination is small, regarding average reflection characteristics of a polarized light component parallel to an incidence plane including the stretched direction (X direction), there might be a case where a certain level of the average reflection is not obtained over a wavelength range of 400 nm to 800 nm.

From the viewpoints of productivity, handling properties of the film, and the like, the upper limit value of the number of lamination is preferably 2,001 layers or less. However, so long as the target average reflectance characteristics are obtained, from the viewpoint productivity or handling properties, the number of lamination may be further reduced, and for example, it may be 1,001 layers, 501 layers, or 301 layers. By making the number of lamination smaller within the range where the target reflection characteristics are satisfied, the thickness of the optical member obtained in the present invention can be made thinner.

(Thickness of Each Layer)

The thickness of each layer of the first layer and second layer is preferably 0.01 μm or more and 0.5 μm or less. In addition, the thickness of each layer of the first layer is more preferably 0.01 μm or more and 0.1 μm or less, and the thickness of the second layer is more preferably 0.01 μm or more and 0.3 μm or less. The thickness of each layer can be determined based on photographs taken using a transmission electrode microscope.

When the uniaxially stretched multi-layer laminate film in the present invention is used as a brightness enhancement member or a reflective polarizing plate of a liquid crystal display or the like, its reflection wavelength band is preferably from a visible light region to near-infrared light region. By regulating the thickness of each layer of the first layer and second layer to such a range, it becomes possible to reflect selectively the light in such a wavelength region by optical interference between the layers. On the other hand, when the layer thickness is more than 0.5 μm, the reflection band region is in an infrared light region. When the layer thickness is less than 0.01 μm, the polyester component absorbs light, so that the reflection performance is not obtained.

(Ratio between Maximum Layer Thickness and Minimum Layer Thickness)

In the uniaxially stretched multi-layer laminate film in the present invention, a ratio between a maximum layer thickness and a minimum layer thickness in each of the first layer and the second layer is preferably 2.0 or more and 5.0 or less, more preferably 2.0 or more and 4.0 or less, still more preferably 2.0 or more and 3.5 or less, and especially preferably 2.0 or more and 3.0 or less. Such a ratio of the layer thicknesses is specifically represented by a ratio of the maximum layer thickness to the minimum layer thickness. The maximum layer thickness and the minimum layer thickness of each of the first layer and the second layer can be determined based on photographs taken using a transmission electron microscope.

In the multi-layer laminate film, the wavelength reflected by the film is determined by the difference in refractive index between the layers, the number of layers, and thickness of the layer. When each of the laminated first layer and second layer has a certain level of thickness, only a specified wavelength is reflected. With respect to the average reflectance characteristics of a polarized light component parallel to the incidence plane including the stretched direction (X direction), the average reflectance cannot be enhanced uniformly over a wide wavelength band of 400 to 800 nm. Thus, it is preferred to use layers having a different thickness from each other. Accordingly, it is preferred to regulate the ratio between the maximum layer thickness and the minimum layer thickness in the above-described way. On the other hand, when the ratio between the maximum layer thickness and the minimum layer thickness is above the upper limit value, the reflection band region becomes wider than 400 nm to 800 nm, and there might be a case where a lowering of the reflectance of the polarized light component parallel to the incidence plane including the stretched direction (X direction) is brought.

The layer thickness of each of the first layer and the second layer may change stepwise or continuously. The change in each of the thus laminated first layer and second layer enables light reflection in a wider wavelength region.

Though a method of laminating the multi-layer structure in the uniaxially stretched multi-layer laminate film of the present invention is not particularly limited, for example, there is exemplified a method using a multi-layer feed block apparatus, wherein the first layer in which the polyester for the first layer is branched into 138 layers and the second layer in which the polyester for the second layer is branched into 137 layers are alternately laminated, and a flow channel thereof changes continuously by 2.0 to 5.0 times.

(Ratio of Average Layer Thicknesses of First layer and Second Layer)

In the uniaxially stretched multi-layer laminate film in the present invention, a ratio of the average layer thickness of the second layer to the average layer thickness of the first layer is preferably in the range of 0.5 times or more and 4.0 times or less. The lower limit value of the ratio of the average layer thickness of the second layer to the average layer thickness of the first layer is more preferably 0.8. The upper limit value of the ratio of the average layer thickness of the second layer to the average layer thickness of the first layer is more preferably 3.0, still more preferably 2.0, and especially preferably 1.5. The most suitable range is 1.1 or more and 3.0 or less, and 1.0 or more and 1.3 or less.

By regulating the ratio of the average layer thickness of the second layer to the average layer thickness of the first layer to an optimum thickness ratio, the light leakage to be caused due to multiple reflection can be more improved. The optimum thickness ratio as referred to herein means a thickness at which a value represented by {(refractive index of the first layer in the stretched direction)×(average layer thickness of the first layer)} and a value (optical thickness) represented by {(refractive index of the second layer in the stretched direction)×(average layer thickness of the second layer)} become equal. When converting from the refractive index characteristics of each of the layers of the present invention, a preferred range of the ratio of the average layer thickness of the second layer to the average layer thickness of the first layer to an optimum thickness ratio is about 1.1 to 3.0.

[Uniaxially Stretched Film]

In order to obtain the optical characteristics as the target reflective polarizing film, the uniaxially stretched multi-layer laminate film of the present invention is stretched at least in one axial direction. The uniaxially stretched film in the present invention includes not only a film stretched only in one axial direction but also a film that is stretched in a biaxial direction and is more stretched in one direction. The uniaxially stretched direction (X direction) may be any of the longitudinal direction (film forming mechanical axis direction) and the widthwise direction (direction orthogonal to the film forming mechanical axis direction and the thickness direction) of the film. In addition, in the case of a film that is stretched in a biaxial direction and is more stretched in one direction, the direction (X direction) in which it is more stretched may be any of the longitudinal direction and the widthwise direction of the film. In the direction having a low stretching ratio, the stretching ratio is kept to be preferably about 1.03 to about 1.20 times, or about 1.05 to 1.20 times from the viewpoint of enhancing the polarization performance. In the case of a film that is stretched in a biaxial direction and is more stretched in one direction, the "stretched direction" refers to the more stretched direction in relation to the polarization or refractive index.

As a stretching method, conventional stretching methods, such as heat stretching using a rod-like heater, roll heat stretching, tenter stretching, etc., can be adopted. From the viewpoint of reduction of scratches to be caused due to contact with rolls, a stretching speed, or the like, tenter stretching is preferred.

(Interlayer refractive Index Characteristics between First Layer and Second Layer)

The difference in refractive index in the X direction between the first layer and the second layer is preferably 0.10 to 0.45, more preferably 0.20 to 0.40, and especially preferably 0.25 to 0.30. When the difference in refractive index in the X direction falls within the above-described range, the reflection characteristics can be efficiently enhanced, and a high refractive index can be obtained using a less number of lamination.

In addition, the difference in refractive index in the Y direction between the first layer and the second layer is preferably 0.05 or less. When the interlayer refractive index difference in the Y direction falls within such a range, the polarization performance is enhanced, and hence, such is preferred.

(Film Thickness)

A film thickness of the uniaxially stretched multi-layer laminate film of the present invention is preferably 15 µm or more and 200 µm or less, more preferably 20 µm or more, still more preferably 30 µm or more, and especially preferably 50 µm or more, and more preferably 150 µm or less, still more preferably 130 µm or less, and especially preferably 100 µm or less. In the first embodiment (Embodiment A) of the present invention, the film thickness of the uniaxially stretched multi-layer laminate film is more preferably 35 µm or more and 150 µm or less. In addition, in the second embodiment (Embodiment B) of the present invention, the film thickness of the uniaxially stretched multi-layer laminate film is more preferably 50 µm or more and 180 µm or less.

<Production Method of Uniaxially Stretched Multi-Layer Laminate Film>

Next, the production method of the uniaxially stretched multi-layer laminate film of the present invention is described in detail.

In the uniaxially stretched multi-layer laminate film of the present invention, the number of lamination can be increased in the following manner. That is, an alternately laminated body having 101 layers or more, or 300 layers or less in total is prepared by alternately laminating a polymer that constitutes the first layer and a polymer that constitutes the second layer in a fused state; preferably, a thick layer (buffer layer) is disposed on the both sides thereof; the alternately laminated body having the buffer layers is, for example, branched into 2 to 4 parts using a device called a layer doubling; and the resulting blocks of the alternately laminated body having the buffer layers are laminated again in a manner such that the number of lamination (the number of doubling) of the blocks becomes 2 to 4 times. By using such a method, the uniaxially stretched multi-layer laminate film having an intermediate layer composed of two buffer layers laminated to each other and an outermost layer (thick film layer) composed of one buffer layer on the both surface of the multi-layer structure can be obtained. Such an alternately laminated body is preferably laminated in such a manner that the thickness of each layer changes stepwise or continuously within the range of 2.0 to 5.0 times.

The unstretched multi-layer film laminated in a desired number of lamination by the method described above is stretched at least in one axial direction (in a direction along the film plane) including a film forming direction or a widthwise direction orthogonal thereto. The stretching is performed at a temperature of preferably a temperature (Tg) of the glass transition point of the polymer of the first layer to (Tg+50°) C., and more preferably (Tg) to (Tg+20°) C. By performing the stretching at a temperature lower than that in the conventional method, the alignment characteristics of the film can be controlled more highly.

The stretching is performed at a stretching ratio of preferably 2 to 10 times, more preferably 2 to 7 times, and still more preferably 4.5 to 6.5 times. In particular, in the second embodiment (Embodiment B) in the present invention, the stretching is performed at a stretching ratio of preferably 2 to 5.8 times, and more preferably 4.5 to 5.5 times. As the stretching ratio is larger, irregularity in the plane direction of the individual layer in the first layer and the second layer is made smaller by thin film processing through stretching; optical interference of the multi-layer stretched film is equalized in the plane direction; and the difference in refraction index in the stretched direction between the first layer and the second layer becomes larger, and hence, such is preferred. As a stretching method at this time, conventional stretching methods, such as heat stretching using a rod-like heater, roll heat stretching, tenter stretching, etc., can be adopted. From the viewpoint of reduction of scratches to be caused due to contact with rolls, a stretching speed, or the like, tenter stretching is preferred.

In addition, in the case of performing biaxial stretching, that is, stretching additionally in a direction (Y direction) orthogonal to such a stretched direction, the stretching ratio is kept preferably at about 1.03 to 1.20 times, or about 1.05 to 1.20 times. When the stretching ratio in the Y direction is larger than this, there might be a case where the polarization performance is lowered.

In addition, after stretching, by further applying toe-out (re-stretching) in the stretched direction within the range of 5 to 15% while performing heat fixing at a temperature of (Tg) to (Tg+30°) C., the alignment characteristics of the resulting uniaxially stretched multi-layer laminate film can be highly controlled.

In the present invention, in the case of providing a coating layer as described later, though coating of a coating liquid onto the film can be carried out at an arbitrary stage, it is preferred to carry out coating in a production process of the film, and it is preferred to coat the coating liquid onto the film before stretching.

<Coating Layer>

In the present invention, it is preferred that a coating layer is further disposed at least on any one of the outermost layers of the uniaxially stretched multi-layer laminate film, and that the coating layer contains an acrylic binder. In addition, from the viewpoint of ensuring the adhesion, a thickness of the coating layer is preferably 0.02 to 0.50 μm, more preferably 0.05 to 0.30 μm, and still more preferably 0.02 to 0.20 μm. When the thickness of the coating layer is below the lower limit, an adhesion effect to the prism layer or the like is not sufficiently revealed. In addition, even when the coating layer is made thick above the upper limit, it is difficult to more improve the adhesion.

In addition, it is preferred that the coating layer contains particles having an average particle diameter of 0.05 to 0.50 μm in an amount of 0.1 to 5.0 wt % on a basis of the weight of the coating layer.

(Binder)

In general, in the case of providing an easily adhesive coating layer on a polyethylene terephthalate film, in many cases, a polyester resin, a urethane resin, an acrylic resin, or the like, each of which has a glass transition point of 30° C. or higher and lower than 100° C., is used as a binder component. By further adding the particles to the coating layer, winding-up properties can be simultaneously ensured.

In addition, in the uniaxially stretched multi-layer laminate film of the present invention, by providing a thick film layer composed of the composition of the second layer as the outermost layers and further disposing the coating layer of the present invention on at least one surface of the outermost layers composed of the second layer, the adhesion to the prism layer or the like can be enhanced. When only either one layer of such an outermost layer or coating layer is provided, there is a tendency that it is difficult to reduce exfoliation of the prism layer or the like to a practically useful level.

In order to enhance the polarization degree, it is preferred that the second layer in the present invention is optically isotropic. As a method of enhancing the isotropy, a method of making the second layer in a non-aligned state, or a method of not performing the heat fixing treatment from the standpoint of production, is adopted. In addition, in the case of the uniaxially stretched multi-layer laminate film of the present invention, an embodiment in which the thick film layer composed of the composition of the second layer is provided as the outermost layer of the multi-layer laminate is preferred from the viewpoint of producing the multi-layer laminate. For that reason, in further providing the coating layer on the surface layer of such an outermost layer, when a polyester resin and/or a urethane resin having high compatibility with the polyester that constitutes the second layer is used, the coating film is mixed with the polyester that constitutes the second layer. Therefore, even when the particles are added to the coating layer, there might be a case where the winding-up properties cannot be sufficiently ensured.

Then, in the case where the thick film layer composed of the second layer is provided as the outermost layers of the multi-layer laminate, and the coating layer is further provided on either one of the outermost layers, in order to enhance the adhesion to such an outermost layer and the winding-up properties, the coating layer preferably contains an acrylic binder, and furthermore, the coating layer preferably contains particles having a predetermined size. Through a combination of the acrylic binder and the above-described particles, even when the outermost layer composed of the composition of the second layer of the present invention is disposed, sufficient winding-up properties are obtained while enhancing the adhesion between the prism layer or the like and the uniaxially stretched multi-layer laminate film of the present invention.

In addition, in the case where the prism layer or diffusion layer is laminated on at least one surface of the uniaxially stretched multi-layer laminate film of the present invention as described later, a solvent-free UV-curable acrylic resin is generally used as the prism layer. Therefore, from the viewpoint of adhesion to the prism layer, it is preferred that the coating layer contains an acrylic binder.

Though the kind of the acrylic binder is not particularly limited, an acrylic copolymer is preferred, and it is preferred that a main component thereof is constituted of methyl methacrylate, ethyl methacrylate, butyl methacrylate, methyl acrylate, ethyl acrylate, butyl acrylate, or the like. As such a main component, not only a single component but also plural components may be used, and by changing a constitution ratio, the glass transition point can be regulated. Of those, a methyl acrylate-ethyl acrylate copolymer is preferred from the viewpoint that the glass transition point is easily regulated. Furthermore, it is preferred that an acrylic component containing, as an adhesion enhancement component or self-linkable component, a hydroxyl group, a carboxyl group, a nitrile group, an amide group, a cyano group, or the like, is added as a minor copolymer component to the above-described acrylic component.

As the (meth)acrylate that is the minor copolymer component, for example, those exemplified below can be used. That is, examples thereof include acrylic acid, methacrylic acid, 2-hydroxyl acrylate, 2-hydroxyl methacrylate, 2-hydroxyethyl acrylate, 2-hydroxylbutyl acrylate, acrylamide, methacrylamide, ethyl acrylamide, butyl acrylamide, dimethyl acrylamide, diethyl acrylamide, hydroxydiethyl acrylamide, N-methylol acrylamide, acrylonitrile, methacrylonitrile, acryloyl morpholine, oxetane methacrylate, and the like. Of those, acrylonitrile, N-methylol acrylamide, 2-hydroxyethyl acrylate, and the like are preferred.

From the viewpoint of ensuring the adhesion to the solve-free prism layer and the viewpoint of reducing the viscosity of the aqueous solution, the acrylic binder is preferably an aqueous emulsion. A particle diameter of such an emulsion is preferably 20 to 80 nm. When the particle diameter of the emulsion is above 80 nm, there might be a case where the transparency of the coating film is lowered. On the other hand, when the particle diameter of the emulsion is les than 20 nm, the resulting emulsion is close to a water-soluble acrylic binder, so that there might be a case where the adhesion to the prism layer is lowered.

(Particle)

In the present invention, it is preferred that the coating layer further contains particles. When the coating layer contains an acrylic binder and further contains particles, even in the case where the outermost layer composed of the composition of the second layer of the present invention, the winding-up properties are enhanced.

As such particles, it is preferred to add inactive inorganic particles, such as silica particles, etc., inactive organic particles, such as acrylic particles, etc., or organic-inorganic composite particles. In addition, it is preferred to use particles having an average particle diameter of preferably 100 nm or more, more preferably 0.05 µm or more, and still more preferably 0.10 µm, and preferably 1,000 nm or less, more preferably 0.50 µm or less, and still more preferably 0.40 µm or less (such particles will be hereinafter sometimes referred to as "large particles"). As for particles whose average particle diameter is less than the lower limit, there might be a case where the winding-up properties are not sufficiently revealed. In addition, even when particles whose average particle diameter is larger than the upper limit are used, it becomes difficult to obtain a more improving effect of winding-up properties, whereas there might be a case where the transparency of the coating layer is lowered.

The addition amount of the particles that are used for the coating layer is preferably 0.1 to 5.0 wt %, more preferably 0.1 wt % or more and 3.0 wt % or less, and still more preferably 0.3 to 2.5 wt % when the whole of components of solids of the coating layer composition is defined as 100 wt %. When the addition amount is less than the lower limit, there might be a case where the winding-up properties are not sufficiently revealed. On the other hand, even when the content of the particles is increased more than the upper limit, it becomes difficult to obtain a more improving effect of winding-up properties, whereas there might be a case where the transparency of the coating layer is lowered.

In addition, in addition to the particles (large particles) having the above-described average particle diameter, it is preferred to further add particles having an average particle diameter of 10 nm or more 80 nm or less (such particles will be hereinafter sometimes referred to as "small particles") in an amount of 0.5 wt % or more and 5.0 wt % or less when the whole of components of solids of the coating layer composition is defined as 100 wt %. When the addition amount of such small particles is less than the lower limit, there might be a case where the enhancing effect of winding-up properties is not sufficiently revealed, whereas when the addition amount of the small particles is more than the upper limit, there might be a case where the transparency is lowered. Similar to the large particles, as for the kind of particles that are used for the small particles, any of inactive inorganic particles represented by silica particles, inactive organic particles represented by acrylic particles or organic-inorganic composite particles are preferred. Furthermore, it is more preferred to use small particles of the same kind as the large particles.

(Surfactant)

In addition, in order to coat an aqueous coating liquid in a thin film state, it is preferred to add a surfactant to the composition of the coating layer.

By the addition of a surfactant, dispersibility and stability of the emulsion are enhanced, whereas there might be a case where the adhesion to the prism layer or the like is lowered. For that reason, it is preferred to keep the content of the surfactant at the minimum use amount within a range where the effect is revealed. Specifically, it is preferred to keep the content of the surfactant at the addition amount of 0.02 to 0.30 wt % on a basis of the weight of the aqueous coating liquid.

As the surfactant, an anionic surfactant, a cationic surfactant, a nonionic surfactant, and the like can be used. For example, anionic or nonionic surfactants, such as a polyoxyalkylene-fatty acid ether, a polyoxyalkylene-aromatic acid ether, a polyoxyalkylene-fatty acid ester, a polyoxyalkylene-aromatic acid ester, a polyoxyethylene-polyoxypropylene (copolymer)-fatty acid ester, a polyoxyethylene-polyoxypropylene (copolymer)-aromatic acid ester, a sorbitan fatty acid ester, a glycerin fatty acid ester, a fatty acid metallic soap, an alkyl sulfate, an alkyl sulfonate, an alkyl sulfosuccinate, etc., can be used. Of those, from the viewpoint of enhancing the adhesion to the prism layer or the like, a polyoxyalkylene-fatty acid ether and a polyoxyalkylene-aromatic acid ether (for example, a polyoxyalkylene phenyl ether) are preferred, and examples thereof include polyoxyethylene tribenzylphenyl ether, polyoxyethylene distyrenated ether, polyoxyethylene distyrenated phenyl ether, polyoxyethylene oleyl ether, and the like.

The addition amount of such a coating layer composition is preferably 1 wt % or more and 10 wt % or less relative to the weight of the composition as converted into the solid component. When the addition amount of the coating layer composition is less than 1 wt %, there might be a case where the stability of the coating film is lowered, and coating defects, such as coating streak, repellence, etc., are liable to be generated. When the addition amount of the coating layer composition is more than 10 wt %, there might be a case where the adhesion of the coating layer to the prism layer or the like is lowered.

<Application>
[Brightness Enhancement Member]

In the uniaxially stretched multi-layer laminate film of the present invention, by using the polyester of the above-described composition for each of the first layer and the second layer, alternately laminating them into multiple layers, and then stretching the assembly in one direction, the resulting laminate film gives rise to a performance so as to reflect selectively one of the polarized light components and transmit selectively the polarized light component in a direction perpendicular to the foregoing polarized light component. Therefore, the uniaxially stretched multi-layer laminate film of the present invention can be used as a brightness enhancement member of a liquid crystal display or the like. In the case of using the uniaxially stretched multi-layer laminate film of the present invention as a brightness enhancement member, a good brightness enhancement factor is obtained, and by reflecting the polarized light component which has not been transmitted on the light source side, the light can be reused.

In addition, a prism layer (sometimes referred to as "prism layer-provided brightness enhancement film") or a diffusion layer may be laminated on at least one surface of the uniaxially stretched multi-layer laminate film of the present invention. On that occasion, it is preferred that the prism layer or the diffusion layer is laminated through the above-described coating layer.

By sticking the uniaxially stretched multi-layer laminate film of the present invention onto a member, such as a prism layer, etc., and forming them in a unit, the number of members at the time of assembling can be reduced, and the thickness of the liquid crystal display can be made thinner. In addition, by sticking these members using the uniaxially stretched multi-layer laminate film of the present invention, interlayer exfoliation to be caused due to an external force applied at the time of processing or the like can be suppressed, and therefore, a brightness enhancement member with higher reliability can be provided.

In the case of using the uniaxially stretched multi-layer laminate film of the present invention as a brightness enhancement member, it can be used for a liquid crystal display device through a configuration shown in FIG. 1.

Specifically, there is exemplified a liquid crystal display device having an embodiment in which a brightness enhancement member 4 is disposed between a light source 5 of a liquid crystal display and a liquid crystal panel 6 configured of (polarizing plate 1)/(liquid crystal cell 2)/ (polarizing plate 3). In the case of further providing a prism layer, it is preferred to dispose the prism layer on the side of the liquid crystal panel 6. In addition, though the installation position of the prism layer is not particularly limited, on the occasion of installing the prism layer on the panel side, its vertex angle is preferably about 90°, and on the occasion of installing the prism layer on the backlight side, its vertex angle is preferably about 60°.

[Liquid Crystal Display Polarizing Plate]

Among the uniaxially stretched multi-layer laminate films of the present invention, with respect to one having a high polarization degree of 99.5% or more, it can be used alone as a polarizing plate of a liquid crystal display that is used adjacent to the liquid crystal cell, without being used jointly with an absorption type polarizing plate.

In the present invention, an optical member for liquid crystal display in which a first polarizing plate composed of the polarizing plate for liquid crystal display of the present invention, a liquid crystal cell, and a second polarizing plate are laminated in this order is also included as an embodiment of the invention. Such an optical member is also called a liquid crystal panel. Such an optical member is corresponding to a symbol 11 in FIG. 3, the first polarizing plate is corresponding to a symbol 9, the liquid crystal cell is corresponding to a symbol 8, and the second polarizing plate is corresponding to a symbol 7.

Hitherto, a high polarization performance has been obtained by disposing at least an absorption type polarizing plate as the polarizing plate on the both sides of a liquid crystal cell. However, so far as a polarizing plate using the uniaxially stretched multi-layer laminate film of the present invention (particularly the second embodiment (Embodiment B)) is concerned, the high polarization performance which could not be attained by the conventional multi-layer laminate films is obtained. Therefore, the uniaxially stretched multi-layer laminate film of the present invention can be used as the polarizing plate that is used adjacent to the liquid crystal cell in place of the absorption type polarizing plate.

That is, the characteristic feature of the present invention resides in the matter that the polarizing plate composed of the uniaxially stretched multi-layer laminate film of the present invention is used alone in one of the liquid crystal cells as the first polarizing plate, and preferably, a configuration in which the first polarizing plate is laminated with the absorption type polarizing plate is excluded.

The kind of the liquid crystal cell is not particularly limited, but any type inclusive of a VA mode, an IPS mode, a TN mode, an STN mode, a Bend alignment (π type), etc. is usable. Of those, it is especially preferred that the present invention is adopted for a VA mode or an IPS mode in which a requirement of view angle characteristics from the azimuth of the oblique direction at 45° is generally high.

In addition, the kind of the second polarizing plate is not particularly limited, but any type inclusive of an absorption type polarizing plate and a reflective polarizing plate is usable. When the reflective polarizing plate is used as the second polarizing plate, it is preferred to use the polarizing plate for liquid crystal display of the present invention.

In the optical member for liquid crystal display of the present invention, it is preferred that the first polarizing plate, the liquid crystal cell, and the second polarizing plate are laminated in this order. Each of these elements may be directly laminated with each other, or may be laminated through a layer of enhancing the interlayer adhesiveness called a pressure-sensitive adhesive layer or an adhesive layer (hereinafter sometimes referred to as "pressure-sensitive adhesive layer"), a protective layer, or the like.

(Formation of Optical Member for Liquid Crystal Display)

As for a method of disposing the polarizing plate on the liquid crystal cell, it is preferred that the both are laminated through a pressure-sensitive adhesive layer. Though a pressure-sensitive adhesive that forms the pressure-sensitive adhesive layer is not particularly limited, one composed of, as a base polymer, a polymer, such as an acrylic polymer, a silicone-based polymer, a polyester, a polyurethane, a polyamide, a polyether, a fluorine-based polymer, a rubber-based polymer, etc., can be properly selected and used. In particular, a pressure-sensitive adhesive such as an acrylic pressure-sensitive adhesive, which is excellent in transparency, has pressure-sensitive characteristics with appropriate wettability, aggregability, and adhesion, and is also excellent in weather resistance, heat resistance, and so on, is preferred. In addition, the pressure-sensitive layer may be provided with a plurality of layers having different compositions or different kinds.

From the viewpoint of workability on the occasion of laminating the liquid crystal cell and the polarizing plate, it is preferred that the pressure-sensitive layer is disposed in advance on one or both of the polarizing plate and the liquid crystal cell. A thickness of the pressure-sensitive adhesive layer can be properly determined according to the purpose of use, an adhesive force, or the like, and it is generally 1 to 500 μm, preferably 5 to 200 μm, and especially preferably 10 to 100 μm.

(Separating Film)

In addition, to the exposed surface of the pressure-sensitive adhesive layer, until being provided for practical use, a separating film (separator) is preferably temporarily attached for covering for the purpose of preventing contamination and others. This prevents the pressure-sensitive adhesive layer from being touched under such a condition as usually being handled. As the separating film, for example, a plastic film, a rubber sheet, paper, a cloth, a nonwoven cloth, a net, a foamed sheet, a metal foil, laminated bodies thereof, and others are usable, which are, if desired, coated with a separating agent, such as a silicone-based separating agent, a long chain alkyl-based separating agent, a fluorine-based separating agent, molybdenum sulfide, etc.

[Liquid Crystal Display]

In the present invention, a liquid crystal display in which a light source and the optical member for liquid crystal display of the present invention are included, and a first polarizing plate is disposed on the light source side is also included as an embodiment of the invention.

Figure 3:
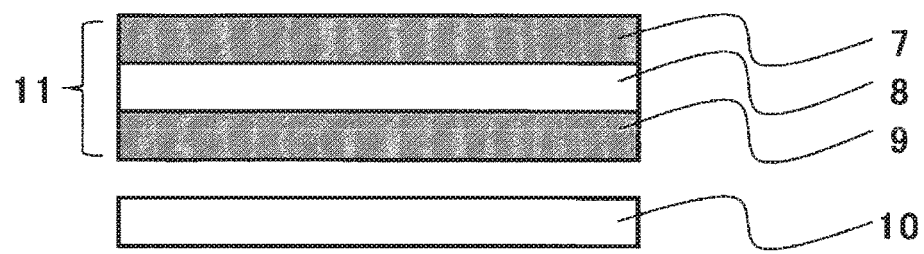
FIG. 3 is a diagrammatic cross-sectional view of a liquid crystal display according to a preferred embodiment of the present invention.

FIG. 3 shows a diagrammatic cross-sectional view of a liquid crystal display that is one of the embodiments of the present invention. The liquid crystal display includes a light source 10 and a liquid crystal panel 11, and furthermore, if desired, a driving circuit and the like are incorporated therein. The liquid crystal panel 11 includes a first polarizing plate 9 on the side of the light source 10 of a liquid crystal cell 8. In addition, a second polarizing plate 7 is included on the opposite side to the light source side of the liquid crystal cell 8, namely on the viewing side. As the liquid crystal cell 8, any type inclusive of a VA mode, an IPS mode, a TN mode, an STN mode, a Bend alignment (n type), etc. is usable. It is especially preferred that the present invention is adopted for a VA mode or an IPS mode.

In the liquid crystal display of the present invention, by disposing the first polarizing plate 9 composed of the polarizing plate for liquid crystal display of the present invention having a high polarization performance on the light source side of the liquid crystal cell 8, the plate can be stuck alone to the liquid crystal cell and used in place of the conventional absorption type polarizing plate. In particular, when a very high polarization performance of 99.5% or more is provided, with respect to the contrast determined from bright part brightness/dark part brightness of a liquid crystal display, a contrast of a very high level requested practically for a liquid crystal television receiver can be attained.

The polarizing plate for liquid crystal display of the present invention is provided with a high polarization performance of 99.5% or more as comparable to the conventional absorption type polarizing plate and a function as a brightness enhancement film capable of reflecting the polarized light which has not been transmitted and reusing it. Therefore, it is not necessary to further use a reflection type polarizing plate called a brightness enhancement film between the light source 10 and the first polarizing plate 9, and the functions of the brightness enhancement film and the polarizing plate used adjacent to the liquid crystal cell can be unified. Thus, the number of members can be reduced.

In addition, typically, as shown in FIG. 3, the second polarizing plate 7 is disposed on the viewing side of the liquid crystal cell 8. The second polarizing plate 7 is not particularly limited, and known ones, such as an absorption type polarizing plate, etc., are usable. When the effect of outside light is extremely small, a reflective polarizing plate of the same kind with the first polarizing plate may be used as the second polarizing plate. In addition, on the viewing side of the liquid crystal cell 8, various kinds of optical layers, such as an optical compensation film, etc., can be disposed besides the second polarizing plate.

(Formation of Liquid Crystal Display)

The liquid crystal display of the present invention is obtained by combining the optical member for a liquid crystal display (liquid crystal panel) and a light source and if desired, incorporating a driving circuit and the like. In addition, besides these, various kinds of members needed to form the liquid crystal display can be combined. However, in a preferred liquid crystal display of the present invention, light radiated from a light source is entered into the first polarizing plate.

In general, the light source of a liquid crystal display is broadly divided into a direct light system and a side light system. In the liquid crystal display of the present invention, any system is usable without limitations.

The liquid crystal display thus obtained is usable in various applications including OA instruments, such as monitors for personal computers, notebook personal computers, copy machines, etc., mobile instruments, such as cellular phones, watches, digital cameras, personal data assistances (PDA), portable game machines, etc., electrical home appliances, such as video cameras, television sets, microwave ovens, etc., in-car instruments, such as back monitors, monitors for car navigation system, car audio systems, etc., display instruments, such as monitors for shop information, etc., security gadgets, such as surveillance monitors, etc., nursing and medical instruments, such as nursing monitors, medical monitors, etc., and the like.

EXAMPLES

The present invention is hereunder described with reference to Examples, but it should be construed that the invention is in no way limited to the following Examples.

Physical properties or characteristics in the Examples were measured or evaluated by the following methods.

(1) Average Transmittance of p-Polarized Light and S-Polarized Light and Polarization Degree:

For the resulting uniaxially stretched multi-layer laminate film, transmittance for P-polarized light, transmittance for S-polarized light, and polarization degree were measured using a polarization degree measurement instrument ("VAP7070S", manufactured by JASCO Corporation).

Polarization degree (P, unit: %) is represented by the following equation (I), wherein a measured value obtained when the transmission axis of a polarizing filter is adjusted in a manner such that it coincides with the stretching direction (X direction) of the film is assigned to P-polarized light, and a measured value obtained when the transmission axis of a polarizing filter is adjusted in a manner such that it is orthogonal to the stretched direction of the film is assigned to S-polarized light.

$$\text{Polarization degree}(P) = \{(Ts-Tp)/(Tp+Ts)\} \times 100 \qquad (1)$$

(In the equation (1), Tp represents an average transmission for P-polarized light in a wavelength range of 400 to 800 nm, and Ts represents an average transmission for S-polarized light in a wavelength range of 400 to 800 nm.)

The measurement was performed while the incident angle of measurement light was selected to be zero degree.

(2) Interlayer Adhesion:

(2-1) Evaluation 1 of Interlayer Adhesion, Adhesion to Prism Layer:

Into a glass mold in which a pattern of a prism lens was formed, a UV-curable acrylic resin composed of the following composition was poured; the resulting polyester was intimately contacted thereon such that the coating layer surface was faced at the resin side; and a UV light was irradiated for 30 seconds using a UV lamp (irradiation intensity: 80 W/cm, 6.4 kW) from a distance of 30 cm on the surface side of the glass-made mold to cure the resin, thereby forming a prism lens layer having a vertex angle of 90°, a pitch of 50 μm, and a height of 30 μm. There was thus obtained a brightness enhancement sheet. On the processed surface of the resulting brightness enhancement sheet, cross-cutting (100 squares of 1 mm$^2$) was applied, and a cellophane adhesive tape having a width of 24 mm (manufactured by Nichiban Co., Ltd.) was stuck thereonto and abruptly peeled away at a peeling angle of 90°. Thereafter, the peeled surface was observed and evaluated according to the following criteria.

<UV-Curable Acrylic Resin>

Ethylene oxide-modified bisphenol A dimethacrylate (FA-321M, manufactured by Hitachi Chemical Co., Ltd.): 46 wt %

Neopentyl glycol-modified trimethylolpropane diacrylate (R-604, manufactured by Nippon Kayaku Co., Ltd.): 25 wt %

Phenoxyethyl acrylate (Viscoat 192, manufactured by Osaka Organic Chemical Industry Ltd.): 27 wt %

2-Hydroxy-2-methyl-1-phenylpropan-1-one (Darocur 1173 manufactured by Merck): 2 wt %

<Criteria of Adhesion Evaluation>

⊚: The peeled area is 0% or more and less than 5% (the adhesive force is extremely good).

○: The peeled area is 5% or more and less than 20% (the adhesive force is good).

X: The peeled area is 20% or more (the adhesive force is poor).

(2-2) Evaluation 2 of Interlayer Adhesion Evaluation:

Using the resulting uniaxially stretched multi-layer laminate film, cross-cutting (100 squares of 1 mm$^2$) was applied, and a cellophane adhesive tape having a width of 24 mm (manufactured by Nichiban Co., Ltd.) was stuck thereonto and abruptly peeled away at a peeling angle of 90°. Thereafter, the peeled surface was observed and evaluated according to the following criteria.

⊚: The peeled area is 0% or more and less than 5% (the adhesive force is extremely good).

○: The peeled area is 5% or more and less than 20% (the adhesive force is good).

x: The peeled area is 20% or more (the adhesive force is poor).

(3) Melting Point (Tm) and Glass Transition Temperature (Tg) of Polymer:

10 mg of each layer sample was sampled, and a melting point and a glass transition temperature of each layer were measured at a temperature elevation rate of 20° C./min by using DSC ("DSC Q400" (trade name), manufactured by TA Instruments).

(4) Identification of Polymer and Quantification of Copolymer Components and Each Component:

For each layer of the film, components of the polymer, copolymer components, and each component were quantified by $^1$H-NMR measurement.

(5) Average Refractive Index after Stretching in Each Direction:

Each resin that constitutes each of the layers was fused, extruded through a die, and cast on a casting drum to prepare a film. The resulting film was stretched in a uniaxial direction at a temperature of {(glass transition temperature of resin)+20° C.} by 5.5 times (designated with "1-*" and "3-*" in the Examples, Comparative Examples, and Reference Example) or by 5 times (designated with "2-*" in the Examples, Comparative Examples, and Reference Example), thereby obtain a stretched film. For the resulting cast film and stretched film, the refractive index (each is referred to as nX, nY, and nZ, respectively) in each of the stretched direction (X direction), the direction orthogonal thereto (Y direction), and the thickness direction (Z direction) was measured at a wavelength of 633 nm using a prism coupler, manufactured by Metricon Corporation to obtain refractive indexes before and after stretching.

For the average refractive index of the polyester that constitutes the first layer, an average value of the refractive indexes in each direction before stretching was used as the average refractive index. Furthermore, for the average refractive index of the polyester that constitutes the second layer, an average value of the refractive indexes in each direction after stretching was used as the average refractive index.

(6) Thickness of Each Layer:

The uniaxially stretched multi-layer laminate film was cut out into 2 mm in the longitudinal direction and 2 cm in the widthwise direction, fixed in an embedding capsule, and embedded by using an epoxy resin ("EPOMOUNT", manufactured by Refine Tec Ltd.). The embedded sample was cut out perpendicularly to the surface in the widthwise direction using a microtome ("ULTRACUT UCT", manufactured by LEICA Corp.) to obtain a 5 nm-thick thin film. Observation and photographing using a transmission electron microscope (Hitachi S-4300) at an acceleration voltage of 100 kV were performed. The thickness of each layer was measured based on the resulting photographs.

Among layers having a thickness of 1 μm or more, the one present inside the multi-layer structure is referred to as an intermediate layer, and the one present in the outermost surface layer is referred to as an outermost layer. The thickness of each layer was measured. In addition, in the case where more than one intermediate layers were present, the thickness of the intermediate layers was obtained from the average value thereof.

In addition, based on the thickness of each layer obtained, a ratio of the maximum thickness with respect to the minimum thickness in the first layer and a ratio of the maximum thickness with respect to the minimum thickness in the second layer were obtained.

In addition, an average thickness of the first layer and an average thickness of the second layer were obtained based on the thickness of each layer obtained. A ratio of the average thickness of the second layer with respect to the average thickness of the first layer was calculated.

When the thicknesses of the first and second layers were evaluated, the intermediate layer and the outermost layer were eliminated from the first and second layers.

In addition, with respect to the coating layer, the thickness of the coating layer was determined by the same method as described above.

(7) Total Thicknesses of Film:

A film sample was nipped in a spindle gauge head ("K107C", manufactured by Anritsu Electric Co., Ltd.). Using a digital differential electronic micrometer ("K351", manufactured by Anritsu Electric Co., Ltd.), a thickness was measured at 10 different positions, and an average value thereof was calculated to obtain the film thickness.

(8) Brightness Enhancement Effect (Brightness Enhancement Rate):

(8-1) Evaluation 1 of Brightness Enhancement Effect:

Using a VA type liquid crystal panel ("AQUOS LC-20E90 (2011 Model)", manufactured by Sharp Corporation), the prism film and the upper diffusion film were eliminated and replaced by the resulting prism layer-provided brightness enhancement film. When white color was displayed, the front brightness of the picture screen of the liquid crystal display was measured using an FPD view angle measurement evaluation apparatus (ErgoScope88), manufactured by Opto Design Inc. The percent of enhancement in brightness with respect to the configuration before replacement was calculated, and the brightness enhancement effect was evaluated according to the following criteria.

◎: The brightness enhancement effect is 150% or more.
○: The brightness enhancement effect is 120% or more and less than 150%.
x: The brightness enhancement effect is less than 120%.

(8-2) Evaluation 2 of Brightness Enhancement Effect:

Using a VA type liquid crystal panel ("AQUOS LC-20E90 (2011 Model)", manufactured by Sharp Corporation), the lower polarizing plate (polarizing plate on the light source side) and the optical compensation film were eliminated and replaced by the multi-layer laminate film sample. When white color was displayed, the front brightness of the picture screen of the liquid crystal display was measured using an FPD view angle measurement evaluation apparatus (ErgoScope88), manufactured by Opto Design Inc. The percent of enhancement in brightness with respect to Comparative Example 1 was calculated, and the brightness enhancement effect was evaluated according to the following criteria.

○: The brightness enhancement effect is 160% or more.
Δ: The brightness enhancement effect is 140% or more and less than 160%.
x: The brightness enhancement effect is less than 140%.

(9) Contrast:

The liquid crystal display obtained was used as a display for a personal computer. When white color and black color screens were displayed by the personal computer, the front brightness of the picture screen of the liquid crystal display was measured using an FPD view angle measurement evaluation apparatus (ErgoScope88), manufactured by Opto Design Inc. Light brightness was obtained from the white screen, and dark brightness was obtained from the black screen. Contrast that is calculated from light brightness/dark brightness was evaluated according to the following criteria.

◎: The contrast (light brightness/dark brightness) is 2,000 or more.
○: The contrast (light brightness/dark brightness) is 1,000 or more and less than 2,000.
x: The contrast (light brightness/dark brightness) is less than 1,000.

(10) Durability at 90° C.:

The uniaxially stretched multi-layer laminate film was stuck onto a transparent optical glass having a thickness of 10 mm through a pressure-sensitive adhesive film, and an initial polarization degree was measured. The assembly was treated at 90° C. for 500 hours using a heating oven (Model No.: SH241, manufactured by Espec Corp.); the film was then taken out and allowed to stand at room temperature for one hour; and the polarization degree was measured. The durability at 90° C. was evaluated according to the following criteria.

◎: The lowering rate of polarization degree after durability test relative to the initial value is less than 2%.
○: The lowering rate of polarization degree after durability test relative to the initial value is 2% or more and less than 4%.
x: The lowering rate of polarization degree after durability test relative to the initial value is 4% or more.

(11) Average Particle Diameter of Particles:

The same measurement as the measurement of layer thickness was performed, a particle diameter of 100 particles in the coating layer was measured, and an average value thereof was defined as the average particle diameter.

(12) Content of Particles:

A solvent that dissolves the binder component that forms the coating layer and does not dissolve the particles was selected; the sampled coating layer was subjected to dissolution treatment; and the particles were then subjected to centrifugation. A ratio (wt %) of the particles relative to the whole weight was defined as the content of particles.

(13) Friction Coefficient:

A static friction coefficient μs and a kinematic friction coefficient μk between the films were measured in conformity with JIS K7125. The measurement was performed 5 times, and an average value thereof was taken as the result.

(14) Haze:

The haze was measured using a haze meter (NDH-2000, manufactured by Nippon Denshoku Industries Co., Ltd.) in conformity with JIS K7136.

(15) Blocking Resistance:

Two sheets of sample films were superimposed such that the coating layer forming layers came into contact with each other; a pressure of 0.6 kg/cm$^2$ was applied to the assembly in an atmosphere at 80° C. and 80% RH for 17 hours; and thereafter, the films were peeled away from each other. The blocking resistance was evaluated by a peeling force at the time of peeling according to the following criteria.

○: Peeling force<98 mN/5 cm in width (good)
Δ: 98 mN/5 cm in width Peeling force<196 mN/5 cm in width (slightly good)
x: 196 mN/5 cm in width Peeling force (poor)

Example 1-1

As a polyester for the first layer, dimethyl 2,6-naphthalenedicarboxylate, dimethyl terephthalate, and ethylene glycol were subjected to ester interchange reaction in the presence of titanium tetrabutoxide and subsequently subjected to polycondensation reaction, thereby preparing a copolymer polyester (DMT5PEN) (intrinsic viscosity: 0.64 dL/g) containing, as an acid component, 95 mol % of a 2,6-naphthalenedicarboxylic acid component (described as PEN in the tables) and 5 mol % of a terephthalic acid component (described as DMT in the tables) and, as a glycol component, ethylene glycol.

In addition, as a polyester for the second layer, dimethyl 2,6-naphthalenedicarboxylate, dimethyl terephthalate, ethylene glycol, and trimethylene glycol were subjected to ester interchange reaction in the presence of titanium tetrabutoxide and subsequently subjected to polycondensation reaction, thereby preparing a copolymer polyester (DMT50C3G15PEN) (intrinsic viscosity: 0.63 dL/g) containing, as an acid component, 50 mol % of a 2,6-naphthalenedicarboxylic acid component (described as PEN in the tables) and 50 mol % of a terephthalic acid component (described as DMT in the tables) and, as a glycol component, 15 mol % of trimethylene glycol.

After drying the prepared polyester for the first layer at 170° C. for 5 hours and drying the polyester for the second layer at 85° C. for 8 hours, the polyesters were fed into first and second extruders, respectively and heated to 300° C. into a fused state. The polyester for the first layer was branched into 138 layers, and the polyester for second layer was branched into 137 layers. Thereafter, using a multi-layer feed block apparatus for alternately laminating the first layer and the second layer and continuously changing the maximum layer thickness and the minimum layer thickness by 3.1 times and 3.0 times in terms of maximum/minimum in each of the first layer and the second layer, a fused body in a laminated state of 275 layers in total, in which the first layer and the second layer were alternately laminated, was formed. While keeping the laminated state, on the both sides thereof, the same polyester as the polyester for the second layer was introduced from a third extruder into a three-layer feed block, thereby further laminating a buffer layer on the both sides in the laminated direction of the fused body in a laminated state having 275 layers in total. The amount supplied to the third extruder was adjusted in a manner such that the sum of the buffer layers on both sides was 47% of the resulting whole body. The laminate was further branched into 2 parts using a layer doubling block and laminated in a ratio of 1/1. The resulting laminate of a total of 553 layers, including an intermediate layer inside thereof and two outermost layers in the outermost surface layer thereof, was introduced into a die while keeping the laminated state and cast on a casting drum so as to adjust the average thickness ratio between the first layer and the second layer to 1.0/1.3. In this way, an unstretched multi-layer laminate film having 553 layers in total was prepared.

On one surface of this unstretched multi-layer laminate film, a coating liquid 1-A having an acrylic binder composition as described below was uniformly coated in a solid component concentration of 4% by a roll coater in such a manner that the coating thickness after stretching and drying was 0.1 μm.

This unstretched multi-layer laminate film was stretched by 5.5 times in the widthwise direction at a temperature of 130° C. The resulting uniaxially stretched multi-layer laminate film had a thickness of 85 μm. [Examples 1-2 to 1-4 and Comparative Examples 1-1 to 1-2]

Uniaxially stretched multi-layer laminate films were obtained in the same method as in Example 1-1, except that as shown in Table 1-1, the resin composition and layer thickness of each of the layers and the stretching conditions were changed. With respect to the thus obtained uniaxially stretched multi-layer laminate films, the resin constitution of each layer, the characteristic features of each layer, and the physical properties of the uniaxially stretching multi-layer laminate film are shown in Table 1-1.

[Coating Liquid 1-A]
(Acrylic Binder)

The acrylic binder is constituted of 60 mol % of methyl methacrylate, 30 mol % of ethyl acrylate, 5 mol % of 2-hydroxyethyl acrylate, and 5 mol % of N-methylol acrylamide (Tg=40° C.). In a four-neck flask, 302 parts of ion exchange water was charged; the temperature was raised to 60° C. in a nitrogen gas stream; subsequently, as a polymerization initiator, 0.5 parts of ammonium persulfate and 0.2 parts of sodium hydrogen sulfite were added; and furthermore, a mixture of, as monomers, 46.7 parts of methyl methacrylate, 23.3 parts of ethyl acrylate, 4.5 parts of 2-hydroxyethyl acrylate, and 3.4 parts of N-methylol acrylamide was added dropwise over 3 hours while adjusting the liquid temperature to 60 to 70° C. After completion of the dropwise addition, while keeping the resultant in the same temperature range for 2 hours, the reaction was continued with stirring and subsequently cooled to obtain an acrylic aqueous dispersion having a solid content of 25 wt %.

(Surfactant) Polyoxyethylene tribenzylphenyl ether (Particles) Acrylic pearl-like particles (average particle diameter: 150 nm, "EPOSTAR MX-100W" (trade name), manufactured by Nippon Shokubai Co., Ltd.)

These were compounded in the following composition ratio.

Acrylic binder/Surfactant/Particles=89 wt %/10 wt %/1 wt % (addition amounts as converted into solid contents)

TABLE 1-1

| | First layer | Tg (° C.) | Tm (° C.) | Second layer | Tg (° C.) | Tm (° C.) | Average refractive index | Number of lamination | Thickness of multi-layer part (μm) |
|---|---|---|---|---|---|---|---|---|---|
| Example 1-1 | DMT5PEN | 110 | 252 | DMT50C3G15PEN | 95 | — | 1.605 | 553 | 45 |
| Example 1-2 | DMT10PEN | 105 | 247 | DMT30C3G30PEN | 95 | — | 1.625 | 553 | 45 |
| Example 1-3 | PEN | 113 | 267 | DMT50C3G15PEN | 95 | — | 1.605 | 553 | 45 |
| Example 1-4 | DMT15PEN | 101 | 243 | DMT40IA5C3G10PEN | 88 | — | 1.615 | 277 | 22 |
| Comparative Example 1-1 | PEN | 113 | 267 | DMT60PEN | 95 | — | 1.600 | 553 | 45 |
| Comparative Example 1-2 | DMT10PEN | 105 | 247 | DMT40IA10PEN | 95 | — | 1.615 | 277 | 22 |

| | Outermost layer/ intermediate layer/ outermost layer (μm) | Film thickness (μm) | Stretching ratio | Stretching temperature (° C.) | Heat fixing temperature (° C.) | Evaluation 1 of interlayer adhesion | Polarization degree | Evaluation 1 of brightness enhancement | Durability at 90° C. |
|---|---|---|---|---|---|---|---|---|---|
| Example 1-1 | 10/20/10 | 85 | 5.5 | 130 | 130 | ⊚ | 93 | ⊚ | ⊚ |
| Example 1-2 | 10/20/10 | 85 | 6.0 | 125 | 130 | ⊚ | 88 | ○ | ⊚ |
| Example 1-3 | 10/20/10 | 85 | 5.5 | 130 | 130 | ○ | 95 | ⊚ | ⊚ |
| Example 1-4 | 7/—/7 | 36 | 6.2 | 130 | 130 | ○ | 85 | ○ | ○ |

TABLE 1-1-continued

| | | | | | | | | | |
|---|---|---|---|---|---|---|---|---|---|
| Comparative Example 1-1 | 10/20/10 | 85 | 6.2 | 130 | 130 | X | 95 | ◉ | ◉ |
| Comparative Example 1-2 | 10/—/10 | 42 | 5.5 | 130 | 130 | X | 87 | ○ | ◉ |

Comparative Example 2-1

(Preparation of Polarizer)

A polymer film ["9P75R" (trade name), manufactured by Kuraray Co., Ltd. (thickness: 75 μm, average polymerization degree: 2,400, saponification degree: 99.9 mol %)] containing a polyvinyl alcohol as a main component was stretched and conveyed between rolls having different circumferential speeds from each other while being dyed. At first, the polyvinyl alcohol film obtained was immersed in a 30° C. water bath for 1 minute and stretched by 1.2 times in a conveying direction while being swollen. Subsequently, the film was immersed for 1 minute at 30° C. in an aqueous solution containing 0.03 wt % of potassium iodide and 0.3 wt % of iodine, and the film was stretched by 3 times with respect to a totally unstretched film (original length) in the conveying direction while being dyed. Then, the film was stretched by 6 times with respect to the original length in the conveying direction while being immersed for 30 seconds at 60° C. in an aqueous solution containing 4 wt % of boric acid and 5 wt % of potassium iodide. Subsequently, the resulting stretched film was dried at 70° C. for 2 minutes to obtain a polarizer. The polarizer had a thickness of 30 μm and a water content of 14.3 wt %.

(Preparation of Adhesive)

An aqueous solution containing 3.7 wt % of solid contents was prepared by dissolving 100 parts by weight of a polyvinyl alcohol-based resin having an acetoacetyl group (average polymerization degree: 1,200, saponification degree: 98.5 mol %, acetoacetylation degree: 5 mol %) and 50 parts by weight of methylol melamine in pure water under a temperature condition at 30° C. An adhesive aqueous solution was prepared by adding 18 parts by weight of an aqueous solution containing a solid of alumina colloid (average particle diameter: 15 nm) in a solid component concentration of 10 wt % and having positive charges to 100 parts by weight of the aqueous solution. The adhesive solution had a viscosity of 9.6 mPa·s and a pH of 4 to 4.5. The blending amount of the alumina colloid was 74 parts by weight based on 100 parts by weight of the polyvinyl alcohol-based resin.

(Preparation of Absorption Type Polarizing Plate)

On one surface of an optical isotropic element ("FUJITAC ZRF80S" (trade name), manufactured by Fujifilm Corporation) having a thickness of 80 μm, a front face retardation of 0.1 nm, and a thickness direction retardation of 1.0 nm, the above-described adhesive containing alumina colloid was coated in a manner such that the thickness after drying was 80 nm. The resultant was laminated to the one surface of the above-described polarizer by roll-to-roll processing in a manner such that both conveying directions became parallel to each other. Subsequently, similarly, on the opposite face of the polarizer, the aforementioned adhesive containing alumina colloid was coated on one surface of an optical isotropic element ("FUJITAC ZRF80S" (trade name), manufactured by Fujifilm Corporation) in a manner such that the thickness after drying was 80 nm. The resultant was laminated by roll-to-roll processing in a manner such that both conveying directions became parallel to each other. Thereafter, a polarizing plate was obtained after drying at 55° C. for 6 minutes. The polarizing plate is referred to as "polarizing plate X".

(Preparation of Liquid Crystal Panel)

A liquid crystal panel was removed from a liquid crystal television set (AQUOS LC-20E90 (2011 Model)", manufactured by Sharp Corporation)) which was provided with a VA-mode liquid crystal cell and employed a direct backlight. A polarizing plate and an optical compensation film disposed on the top and bottom of the liquid crystal cell were removed. The glass faces (front and rear) of the liquid crystal cell were cleaned. Subsequently, the above-described polarizing plate X was disposed on the light source side of the liquid crystal cell through an acrylic pressure-sensitive adhesive in the same direction with the absorption axis of the polarizing plate that had been disposed on the light source side of the original liquid crystal panel.

Subsequently, the visual contact side of the above-described polarizing plate X was disposed on the liquid crystal cell through an acrylic pressure-sensitive adhesive in the same direction with the absorption axis of the polarizing plate that had been disposed on the visual contact side of the original liquid crystal panel. In this way, a liquid crystal panel was obtained in which the polarizing plate X was disposed on the one main surface of the liquid crystal cell, and the polarizing plate X was disposed on the other main surface thereof.

(Preparation of Liquid Crystal Display)

The above-described liquid crystal panel was incorporated into the original liquid crystal television set. The light source of the liquid crystal television set was lighted, and a white color screen and a black color screen were displayed by using a personal computer. Then, the brightness of the liquid crystal display device evaluated.

Example 2-1

Dimethyl 2,6-naphthalenedicarboxylate, 6,6'-(ethylenedioxy)di-2-naphthoic acid, and ethylene glycol were subjected to esterification reaction and ester interchange reaction in the presence of titanium tetrabutoxide and subsequently subjected to polycondensation reaction, thereby preparing an aromatic polyester (described as ENA30PEN in the tables) having an intrinsic viscosity of 0.63 dL/g, in which 70 mol % of the acid component is a 2,6-naphthalenedicarboxylic acid component, 30 mol % of the acid component is a 6,6'-(ethylenedioxy)di-2-naphthoic acid (described as ENA in the tables), and the glycol component is ethylene glycol, as the polyester for the first layer and also preparing a copolymer polyester (intrinsic viscosity: 0.70 dL/g) composed of 75 mol % of 2,6-naphthalenedicarboxylic acid, 25 mol % of terephthalic acid, 62 mol % of ethylene glycol, 33 mol % of trimethylene glycol, and 5 mol % of spiro glycol, as the polyester for the second layer.

After drying the prepared polyester for the first layer at 170° C. for 5 hours and drying the polyester for the second layer at 85° C. for 8 hours, the polyesters were fed into first and second extruders, respectively and heated to 300° C. into a fused state. The polyester for the first layer was branched into 138 layers, and the polyester for second layer was branched into 137 layers. Thereafter, using a multi-layer feed block apparatus for alternately laminating the first layer and the second layer and continuously changing the maximum layer thickness and the minimum layer thickness by 3.1 times and 3.0 times in terms of maximum/minimum in each of the first layer and the second layer, a fused body in a laminated state of 275 layers in total, in which the first layer and the second layer were alternately laminated, was formed. While keeping the laminated state, on the both sides thereof, the same polyester as the polyester for the second layer was introduced from a third extruder into a three-layer feed block, thereby further laminating a buffer layer on the both sides in the laminated direction of the fused body in a laminated state having 275 layers in total. The amount supplied to the third extruder was adjusted in a manner such that the sum of the buffer layers on both sides was 23% of the resulting whole body. The laminate was further branched into 3 parts using a layer doubling block and laminated in a ratio of 1/1/1. The resulting laminate of a total of 829 layers, including two intermediate layers inside thereof and two outermost layers in the outermost surface layer thereof, was introduced into a die while keeping the laminated state and cast on a casting drum so as to adjust the average thickness ratio between the first layer and the second layer to 1.0/2.6. In this way, an unstretched multi-layer laminate film having 829 layers in total was prepared.

This unstretched multi-layer film was stretched by 5.0 times in the widthwise direction at 115° C., and then the film was subjected to heat fixing treatment at 120° C. for 3 seconds while the film was stretched by 15% in the same direction at 115° C. The resulting uniaxially stretched multi-layer laminate film had a thickness of 105 μm.

(Formation of Liquid Crystal Panel)

A liquid crystal panel in which the resulting reflective polarizing film (first polarizing plate) was disposed on the main surface of the liquid crystal cell on the light source side, and the polarizing plate X (second polarizing plate) was disposed on the main surface on the visual contact side was obtained in the same manner as in Comparative Example 2-1, except that in Comparative Example 2-1, the resulting reflective polarizing film was used as the first polarizing plate on the light source side in place of the polarizing plate X.

(Preparation of Liquid Crystal Display)

The above-described liquid crystal panel was incorporated into the original liquid crystal display. The light source of the liquid crystal display was lighted, and brightness of a white screen and a black screen of a personal computer was evaluated.

With respect to the thus obtained uniaxially stretched multi-layer laminate films, the resin constitution of each layer and the characteristic features of each layer are shown in Table 2-1, and the physical properties of the uniaxially stretching multi-layer laminate film and liquid crystal display are shown in Table 2-2.

Examples 2-2 to 2-4

Uniaxially stretched multi-layer laminate films were obtained in the same manner as in Example 2-1, except that as shown in Table 2-1, the resin composition and layer thickness of each of the layers and the stretching conditions were changed. With respect to the thus obtained uniaxially stretched multi-layer laminate films, the resin constitution of each layer and the characteristic features of each layer are shown in Table 2-1, and the physical properties of the uniaxially stretching multi-layer laminate films and liquid crystal displays are shown in Table 2-2.

In Example 2-2, the uniaxially stretched multi-layer laminate film was obtained in the same manner as in Example 2-1, except for using ENA40PEN (an aromatic polyester in which 60 mol % of the acid component is a 2,6-naphthalenedicarboxylic acid component, 40 mol % of the acid component is a 6,6'-(ethylenedioxy)di-2-naphthoic acid component, and the glycol component is ethylene glycol) as the polyester for the first layer, using a copolymer polyester resin B shown in Table 2-3 as the polyester for the second layer, and changing the stretching temperature to 120° C. and the stretching ratio to 5.1 times, respectively.

In Example 2-3, the uniaxially stretched multi-layer laminate film was obtained in the same manner as in Example 2-1, except for using ENA35PEN (an aromatic polyester in which 65 mol % of the acid component is a 2,6-naphthalenedicarboxylic acid component, 35 mol % of the acid component is a 6,6'-(ethylenedioxy)di-2-naphthoic acid component, and the glycol component is ethylene glycol) as the polyester for the first layer, using a copolymer polyester resin C shown in Table 2-3 as the polyester for the second layer, stretching the film in the widthwise direction at a stretching temperature of 130° C. and a stretching ratio of 5.8 times, and further performing heat fixing treatment at 130° C. for 3 seconds while stretching by 10% in the same direction at 130° C.

In Example 2-4, the uniaxially stretched multi-layer laminate film was obtained in the same manner as in Example 2-1, except for using BB30PEN (an aromatic polyester in which 70 mol % of the acid component is a 2,6-naphthalenedicarboxylic acid component, 30 mol % of the acid component is a diphenyl dicarboxylic acid component, and the glycol component is ethylene glycol) as the polyester for the first layer, using a copolymer polyester resin D shown in Table 2-3 as the polyester for the second layer, stretching the film in the widthwise direction at a stretching temperature of 125° C. and a stretching ratio of 4.6 times, and further performing heat fixing treatment at 125° C. for 3 seconds while stretching by 10% in the same direction at 125° C.

In addition, a liquid crystal panel in which the resulting uniaxially stretched laminate film (first polarizing plate) was disposed on the main surface of the liquid crystal cell on the light source side, and the polarizing plate X (second polarizing plate) was disposed on the main surface on the visual contact side was obtained in the same manner as in Comparative Example 2-1, except that in Comparative Example 2-1, the resulting uniaxially stretched laminate film was used as the first polarizing plate on the light source side in place of the polarizing plate X.

The above-described liquid crystal panel was incorporated into the original liquid crystal display. The light source of the liquid crystal display was lighted, and brightness of a white screen and a black screen of a personal computer was evaluated.

Comparative Example 2-2

A uniaxially stretched multi-layer laminate film was obtained in the same manner as in Example 2-1, except for using ENA35PEN (an aromatic polyester in which 65 mol % of the acid component is a 2,6-naphthalenedicarboxylic acid component, 35 mol % of the acid component is a 6,6'-(ethylenedioxy)di-2-naphthoic acid component, and the glycol component is ethylene glycol) as the polyester for the first layer, using a copolymer polyester resin E shown in Table 2-3 as the polyester for the second layer, stretching the film in the widthwise direction at a stretching temperature of 135° C. and a stretching ratio of 6.0 times, and further performing heat fixing treatment at 120° C. for 3 seconds while stretching by 15% in the same direction at 135° C.

In addition, a liquid crystal panel in which the resulting uniaxially stretched laminate film (first polarizing plate) was disposed on the main surface of the liquid crystal cell on the light source side, and the polarizing plate X (second polarizing plate) was disposed on the main surface on the visual contact side was obtained in the same manner as in Comparative Example 2-1, except that in Comparative Example 2-1, the resulting uniaxially stretched laminate film was used as the first polarizing plate on the light source side in place of the polarizing plate X.

The above-described liquid crystal panel was incorporated into the original liquid crystal display. The light source of the liquid crystal display was lighted, and brightness of a white screen and a black screen of a personal computer was evaluated.

The physical properties of the resulting uniaxially stretched multi-layer laminate film and the physical properties of the liquid crystal display are shown in Table 2-2.

Comparative Example 2-3

A uniaxially stretched multi-layer laminate film was obtained in the same manner as in Example 2-1, except for using ENA21PEN (an aromatic polyester in which 79 mol % of the acid component is a 2,6-naphthalenedicarboxylic acid component, 21 mol % of the acid component is a 6,6'-(ethylenedioxy)di-2-naphthoic acid component, and the glycol component is ethylene glycol) as the polyester for the first layer, using a copolymer polyester resin F shown in Table 2-3 as the polyester for the second layer, stretching the film in the widthwise direction at a stretching temperature of 120° C. and a stretching ratio of 5.2 times, and further performing heat fixing treatment at 120° C. for 3 seconds while stretching by 15% in the same direction at 120° C.

In addition, a liquid crystal panel in which the resulting uniaxially stretched laminate film (first polarizing plate) was disposed on the main surface of the liquid crystal cell on the light source side, and the polarizing plate X (second polarizing plate) was disposed on the main surface on the visual contact side was obtained in the same manner as in Comparative Example 2-1, except that in Comparative Example 2-1, the resulting uniaxially stretched laminate film was used as the first polarizing plate on the light source side in place of the polarizing plate X.

The above-described liquid crystal panel was incorporated into the original liquid crystal display. The light source of the liquid crystal display was lighted, and brightness of a white screen and a black screen of a personal computer was evaluated.

The physical properties of the resulting uniaxially stretched multi-layer laminate film and the physical properties of the liquid crystal display are shown in Table 2-2.

TABLE 2-1

| | First layer | | | | Second layer | | | Number of optical interference layer | Thickness of optical interference layer per unit [µm] |
|---|---|---|---|---|---|---|---|---|---|
| | Resin | | | | | Resin | | | |
| | Kind of resin | Melting point (° C.) | Tg (° C.) | Number of layer | Kind of resin | Tg (° C.) | Number of layer | | |
| Example 2-1 | ENA30 PEN | 225 | 113 | 138 | Resin A | 98 | 137 | 275 | 27 |
| Example 2-2 | ENA40 PEN | 235 | 109 | 138 | Resin B | 75 | 137 | 275 | 27 |
| Example 2-3 | ENA35 PEN | 233 | 113 | 138 | Resin C | 78 | 137 | 275 | 27 |
| Example 2-4 | BB30 PEN | 230 | 110 | 138 | Resin D | 90 | 137 | 275 | 27 |
| Comparative Example 2-2 | ENA35 PEN | 233 | 113 | 138 | Resin E | 100 | 137 | 275 | 27 |
| Comparative Example 2-3 | ENA21 PEN | 234 | 114 | 138 | Resin F | 98 | 137 | 275 | 27 |

| | Number of doubling | Outmost layer/ intermediate layer/ intermediate layer/ outermost layer [µm] | Whole thickness [µm] | Layer thickness ratio (second layer/ first layer) | First layer | | Maximum/ minimum |
|---|---|---|---|---|---|---|---|
| | | | | | Minimum thickness [nm] | Maximum thickness [nm] | |
| Example 2-1 | 3 | 4/8/8/4 | 105 | 2.6 | 40 | 124 | 3.1 |
| Example 2-2 | 3 | 4/8/8/4 | 105 | 2.6 | 40 | 125 | 3.1 |
| Example 2-3 | 3 | 6/12/12/6 | 117 | 2.6 | 41 | 126 | 3.1 |
| Example 2-4 | 3 | 15/30/30/15 | 171 | 2.6 | 42 | 126 | 3.0 |
| Comparative Example 2-2 | 1 | 4/—/—/4 | 35 | 2.6 | 40 | 124 | 3.1 |
| Comparative Example 2-3 | 3 | 4/8/8/4 | 105 | 2.6 | 40 | 124 | 3.1 |

TABLE 2-1-continued

| | Second layer | | | Stretching in the film forming direction | | Stretching in the widthwise direction | | Toe-out % | Heat fixing temperature ° C. |
|---|---|---|---|---|---|---|---|---|---|
| | Minimum thickness [nm] | Maximum thickness [nm] | Maximum/ minimum | Ratio (times) | Temperature (° C.) | Ratio (times) | Temperature (° C.) | | |
| Example 2-1 | 46 | 138 | 3.0 | 1.0 | — | 5.0 | 115 | 15 | 120 |
| Example 2-2 | 48 | 140 | 2.9 | 1.0 | — | 5.1 | 120 | 15 | 120 |
| Example 2-3 | 45 | 139 | 3.1 | 1.0 | — | 5.8 | 130 | 10 | 130 |
| Example 2-4 | 46 | 140 | 3.0 | 1.0 | — | 4.6 | 125 | 10 | 125 |
| Comparative Example 2-2 | 46 | 138 | 3.0 | 1.0 | — | 6.0 | 135 | 15 | 120 |
| Comparative Example 2-3 | 46 | 138 | 3.0 | 1.0 | — | 5.2 | 120 | 15 | 120 |

TABLE 2-2

| | Optical characteristics at the time of 0° incidence | | | | | |
|---|---|---|---|---|---|---|
| | Average transmittance | | | Evaluation 2 of interlayer adhesion | Evaluation 2 of brightness enhancement effect | Contrast |
| | P-Polarized light transmittance [%] | S-Polarized light transmittance [%] | Polarization degree | | | |
| Example 2-1 | 0.15 | 85.0 | 99.65 | ◎ | ○ | ○ |
| Example 2-2 | 0.05 | 85.0 | 99.88 | ◎ | ○ | ◎ |
| Example 2-3 | 0.02 | 86.0 | 99.97 | ○ | ○ | ◎ |
| Example 2-4 | 0.15 | 84.0 | 99.64 | ○ | ○ | 0 |
| Comparative Example 2-2 | 2.00 | 85.0 | 95.40 | X | ○ | X |
| Comparative Example 2-3 | 0.20 | 85.0 | 99.53 | X | ○ | ○ |

TABLE 2-3

| Copolymer polyester | Carboxylic acid component (mol %) | | | Glycol component (mol %) | | | Glass transition temperature (° C.) | Average refractive index (-) |
|---|---|---|---|---|---|---|---|---|
| | ENA | NDC | TA | EG | TMG | SPG | Tg | n (Ave) |
| Resin A | — | 75 | 25 | 62 | 33 | 5 | 98 | 1.603 |
| Resin B | 18 | 32 | 50 | 52 | 25 | 23 | 75 | 1.583 |
| Resin C | — | 40 | 60 | 78 | 10 | 12 | 78 | 1.587 |
| Resin D | 48 | 52 | 0 | 62 | 33 | 5 | 90 | 1.610 |
| Resin E | — | 25 | 75 | 85 | — | 15 | 100 | 1.585 |
| Resin F | — | 40 | 60 | 100 | — | — | 98 | 1.610 |

Reference Production Example 3-1

As a polyester for the first layer, dimethyl 2,6-naphthalenedicarboxylate and ethylene glycol were subjected to ester interchange reaction in the presence of titanium tetrabutoxide and subsequently subjected to polycondensation reaction, thereby preparing polyethylene-2,6-naphthalenedicarboxylate (PEN) having an intrinsic viscosity of 0.55 dL/g).

In addition, as a polyester for the second layer, dimethyl 2,6-naphthalenedicarboxylate, dimethyl terephthalate, and ethylene glycol were subjected to ester interchange reaction in the presence of titanium tetrabutoxide and subsequently subjected to polycondensation reaction, thereby preparing a copolymer polyester (DMT40PEN) (intrinsic viscosity: 0.63 dL/g) containing, as an acid component, 60 mol % of a 2,6-naphthalenedicarboxylic acid component (described as PEN in the tables) and 40 mol % of a terephthalic acid component (described as DMT in the tables) and, as a glycol component, ethylene glycol.

The polyester for the first layer was branched into 138 layers, and the polyester for second layer was branched into 137 layers. Thereafter, using a multi-layer feed block apparatus for alternately laminating the first layer and the second layer and continuously changing the maximum layer thickness and the minimum layer thickness by 2.2 times in terms of maximum/minimum in each of the first layer and the second layer, a fused body in a laminated state of 275 layers in total, in which the first layer and the second layer were alternately laminated, was formed. While keeping the laminated state, on the both sides thereof, the same polyester as the polyester for the second layer was introduced from a third extruder into a three-layer feed block, thereby further laminating a buffer layer on the both sides in the laminated direction of the fused body in a laminated state having 275 layers in total. The amount supplied to the third extruder was adjusted in a manner such that the sum of the buffer layers on both sides was 42% of the resulting whole body. The laminate was further branched into 2 using a layer doubling block and laminated in a ratio of 1/1. The resulting laminate of a total of 553 layers, including one intermediate layer inside thereof and two outermost layers in the outermost surface layer thereof, was introduced into a die while keeping the laminated state and cast on a casting drum so as to adjust the average thickness ratio between the first layer and the second layer to 1.0/1.2. In this way, an unstretched multi-layer laminate film having 553 layers in total was prepared.

On one surface of this unstretched multi-layer laminate film, a coating liquid 3-A having a composition shown in Table 3-2 was uniformly coated in a solid component concentration of 4% by a roll coater in such a manner that the coating thickness after drying was 0.1 μm.

This unstretched multi-layer laminate film was stretched by 5.2 times in the widthwise direction at a temperature of 130° C. The resulting uniaxially stretched multi-layer laminate film had a thickness of 85 μm. Using a prism layer-provided brightness enhancement film in which a prism layer was laminated on the coating layer surface of the resulting uniaxially stretched multi-layer laminate film in conformity with the measurement method (2-1), the brightness enhancement effect was measured by the method of the measurement method (8-1).

The uniaxially stretched multi-layer laminate film of the present invention had high adhesion between the prism layer and the film, and the exfoliation of the prism layer was reduced. In addition, the uniaxially stretched multi-layer laminate film of the present invention was also excellent in blocking resistance, so that the winding-up properties were good.

Comparative Examples 3-1 to 3-4

Uniaxially stretched multi-layer laminate films and prism layer-provided brightness enhancement films were obtained in the same manner as in Reference Production Example 3-1, except for changing the resin composition, the laminate configuration, and coating layer composition as shown in Tables 3-1 and 3-2.

Example 3-1

Dimethyl 2,6-naphthalenedicarboxylate, 6,6'-(ethylenedioxy)di-2-naphthoic acid, and ethylene glycol were subjected to esterification reaction and ester interchange reaction in the presence of titanium tetrabutoxide and subsequently subjected to polycondensation reaction, thereby preparing an aromatic polyester (described as ENA30PEN in the tables) having an intrinsic viscosity of 0.63 dL/g, in which 70 mol % of the acid component is a 2,6-naphthalenedicarboxylic acid component, 30 mol % of the acid component is a 6,6'-(ethylenedioxy)di-2-naphthoic acid (described as ENA in the tables), and the glycol component is ethylene glycol, as the polyester for the first layer and also preparing a copolymer polyester (intrinsic viscosity: 0.70 dL/g) composed of 66 mol % of 2,6-naphthalenedicarboxylic acid (described as NDC in the tables), 34 mol % of terephthalic acid, 50 mol % of ethylene glycol, 15 mol % of spiro glycol (described as SPG in the tables), and 35 mol % of trimethylene glycol (described as TMG in the tables), as the polyester for the second layer.

After drying the prepared polyester for the first layer at 170° C. for 5 hours and drying the polyester for the second layer at 85° C. for 8 hours, the polyesters were fed into first and second extruders, respectively and heated to 300° C. into a fused state. The polyester for the first layer was branched into 138 layers, and the polyester for second layer was branched into 137 layers. Thereafter, using a multi-layer feed block apparatus for alternately laminating the first layer and the second layer and continuously changing the maximum layer thickness and the minimum layer thickness by 3.1 times and 3.0 times in terms of maximum/minimum in each of the first layer and the second layer, a fused body in a laminated state of 275 layers in total, in which the first layer and the second layer were alternately laminated, was formed. While keeping the laminated state, on the both sides thereof, the same polyester as the polyester for the second layer was introduced from a third extruder into a three-layer feed block, thereby further laminating a buffer layer on the both sides in the laminated direction of the fused body in a laminated state having 275 layers in total. The amount supplied to the third extruder was adjusted in a manner such that the sum of the buffer layers on both sides was 80% of the resulting whole body.

The resulting laminate of a total of 277 layers, including the outermost layers, was introduced into a die while keeping the laminated state and cast on a casting drum so as to adjust the average thickness ratio between the first layer and the second layer to 1.0/1.0. In this way, an unstretched multi-layer laminate film having 277 layers in total was prepared.

On one surface of this unstretched multi-layer laminate film, a coating liquid 3-A having a composition shown in Table 3-2 was uniformly coated in a solid component concentration of 4% by a roll coater in such a manner that the coating thickness after drying was 0.1 μm.

This unstreched multi-layer film was stretched by 6.5 times in the widthwise direction at 120° C., and then the film was subjected to heat fixing treatment at 120° C. for 3 seconds while the film was stretched by 15% in the same direction at 120° C. The resulting uniaxially stretched multi-layer laminate film had a thickness of 112 μm.

Using a prism layer-provided brightness enhancement film in which a prism layer was laminated on the coating layer surface of the resulting uniaxially stretched multi-layer laminate film in conformity with the measurement method (2-1), the brightness enhancement effect was measured by the method of the measurement method (8-1).

The uniaxially stretched multi-layer laminate film of the present invention had high adhesion between the prism layer and the film, and the exfoliation of the prism layer was reduced. In addition, the uniaxially stretched multi-layer laminate film of the present invention was also excellent in blocking resistance, so that the winding-up properties were good.

Comparative Example 3-5

Fused polyethylene terephthalate ([η]=0.62 dL/g, Tg=78° C.) was extrude from a die and then cooled by a cooling drum in the usual way to form an unstretched film. Subsequently, the unstretched film was stretched by 4.0 times at 95° C. in the widthwise direction, and on one surface thereof, a coating liquid 3-D (solid component concentration: 4 wt %) composed of coating layer constituent components as shown in Table 3-2 was uniformly coated by a roll coater in such a manner that the coating thickness after drying was 0.1 μm. Subsequently, a film having a thickness of 50 μm was obtained in the same method as in Reference Production Example 3-1, except that this coating film was subsequently dried at 95° C. and shrunk by 3% at 180° C. in the widthwise direction, to achieve heat fixing.

Using a prism layer-provided brightness enhancement film in which a prism layer was laminated on the coating layer surface of the resulting uniaxially stretched multi-layer laminate film in conformity with the measurement method (2-1), the brightness enhancement effect was measured by the method of the measurement method (8-1).

In the case of the polyethylene terephthalate single-layer film, the adhesion to the prism layer could be enhanced by using a coating layer composed of a polyester as the binder component.

[Coating Layer Composition]
(Acrylic A)

The acrylic A is constituted of 60 mol % of methyl methacrylate, 30 mol % of ethyl acrylate, 5 mol % of 2-hydroxyethyl acrylate, and 5 mol % of N-methylol acrylamide (Tg=40° C.). In a four-neck flask, 302 parts of ion exchange water was charged; the temperature was raised to 60° C. in a nitrogen gas stream; subsequently, as a polymerization initiator, 0.5 parts of ammonium persulfate and 0.2 parts of sodium hydrogen sulfite were added; and furthermore, a mixture of, as monomers, 46.7 parts of methyl methacrylate, 23.3 parts of ethyl acrylate, 4.5 parts of 2-hydroxyethyl acrylate, and 3.4 parts of N-methylol acrylamide was added dropwise over 3 hours while adjusting the liquid temperature to 60 to 70° C. After completion of the dropwise addition, while keeping the resultant in the same temperature range for 2 hours, the reaction was continued with stirring and subsequently cooled to obtain an acrylic 1 aqueous dispersion having a solid content of 25 wt %.

(Acrylic B)

The acrylic B was synthesized in the same manner as in the acrylic A, except for adjusting a monomer composition such that it was constituted of 60 mol % of methyl methacrylate, 35 mol % of ethyl acrylate, and 5 mol % of N-methylol acrylamide.

(Polyester A)

The polyester A is constituted of, as an acid component, mol % of 2,6-naphthalenedicarboxylic acid, 20 mol % of isophthalic acid, and 5 mol % of 5-sodium sulfoisophthalate and, as a glycol component, 90 mol % of ethylene glycol and 10 mol % of diethylene glycol (Tg=80° C., average molecular weight=15,000).

The polyester A was produced in the following manner. That is, 51 parts of 2,6-naphthalenedicarboxylic acid, 11 parts of isophthalic acid, 4 parts of 5-sodium sulfoisophthalate, 31 parts of ethylene glycol, and 2 parts of diethylene glycol were charged into a reactor, to which was then added 0.05 parts of titanium tetrabutoxide. The contents were heated in a nitrogen atmosphere while controlling the temperature at 230° C., and the produced methanol was distilled off to perform ester exchange reaction. Subsequently, in a polymerization tank with a high motor torque of a stirrer, the temperature of the reaction system was gradually increased to 255° C., and the inside of the system was evacuated to 1 mmHg to achieve polycondensation reaction, thereby obtaining the polyester A having an intrinsic viscosity of 0.56. 25 parts of this polyester was dissolved in 75 parts of tetrahydrofuran; to the resulting solution, 75 parts of water was added dropwise while high-speed stirring at 10,000 rpm, to obtain a milk white dispersion; and subsequently, this dispersion was distilled under reduced pressure of 20 mmHg, thereby distilling off the tetrahydrofuran. There was thus obtained an aqueous dispersion of the polyester A having a solid content of 25 wt %.

(Polyester B)

The polyester B was polymerized in the same manner as in the polyester A, except for adjusting the monomer composition in such a manner that the acid component contains 90 mol % of terephthalic acid, 5 mol % of isophthalic acid, and 5 mol % of 5-sodium sulfoisophthalate, and the glycol component contains 90 mol % of ethylene glycol and 10 mol % of diethylene glycol (Tg=70° C., average molecular weight=15,000).

(Surfactant A) Polyoxyethylene tribenzylphenyl ether
(Surfactant B) Polyoxyethylene distyrenated phenyl ether
(Surfactant C) Polyoxyethylene oleyl ether
(Particle A)

Acrylic pearl-like particles (average particle diameter: 150 nm, "EPOSTAR MX-100W" (trade name), manufactured by Nippon Shokubai Co., Ltd.)

(Particle B)

Acrylic pearl-like particles (average particle diameter: 300 nm, "EPOSTAR MX-200W" (trade name), manufactured by Nippon Shokubai Co., Ltd.)

(Particle C)

Silica pearl-like particles (average particle diameter: 500 nm, "SEAHOSTAR KE-W50" (trade name), manufactured by Nippon Shokubai Co., Ltd.)

TABLE 3-1

| | First layer | Tg (° C.) | Tm (° C.) | Second layer | Average refractive index | Tg (° C.) | Tm (° C.) | Number of lamination | Thickness of multi-layer part (μm) | Thickness of outermost layer (μm) | Thickness of intermediate layer (μm) |
|---|---|---|---|---|---|---|---|---|---|---|---|
| Example 3-1 | ENA30PEN | 113 | 225 | NDC66SPG15TMG35PET | 1.61 | 90 | — | 277 | 22 | 45/45 | — |
| Comparative Example 3-1 | PEN | 113 | 267 | DMT40PEN | 1.61 | 95 | — | 557 | 45 | 10/10 | 20 |
| Comparative Example 3-2 | PEN | 113 | 267 | DMT40PEN | 1.61 | 95 | — | 557 | 45 | 10/10 | 20 |
| Comparative Example 3-3 | PEN | 113 | 267 | DMT40PEN | 1.61 | 95 | — | 557 | 45 | 10/10 | 20 |
| Comparative Example 3-4 | PEN | 113 | 267 | DMT40PEN | 1.61 | 95 | — | 557 | 45 | 2/2 | 4 |

TABLE 3-1-continued

| | | | | | | | | | | Brightness | | |
|---|---|---|---|---|---|---|---|---|---|---|---|---|
| Comparative Example 3-5 | | | | | | PET | | | | | | |

| | Film thickness (μm) | Stretching ratio | Stretching temperature (° C.) | Heat fixing temperature (° C.) | Coating liquid | Polarization degree | Friction coefficient μs/μk | Haze | Brightness enhancement factor | Adhesion | Blocking resistance |
|---|---|---|---|---|---|---|---|---|---|---|---|
| Example 3-1 | 112 | 6.5 | 120 | 120 | 3-A | 98 | 0.5/0.5 | 0.6 | ○ | ○ | ○ |
| Comparative Example 3-1 | 85 | 5.2 | 130 | 130 | — | 95 | Unmeasurable | 0.4 | ○ | x | ○ |
| Comparative Example 3-2 | 85 | 5.2 | 130 | 130 | 3-D | 95 | 0.8/0.7 | 0.6 | ○ | Δ | x |
| Comparative Example 3-3 | 85 | 5.2 | 130 | 130 | 3-E | 95 | 0.8/0.7 | 0.6 | ○ | Δ | x |
| Comparative Example 3-4 | 53 | 5.2 | 130 | 130 | 3-A | 93 | 0.5/0.5 | 0.8 | ○ | x | ○ |
| Comparative Example 3-5 | 50 | 4.0 | 95 | 180 | 3-D | 2 or less | 0.4/0.4 | 0.6 | x | ○ | ○ |

TABLE 3-2

| Coating liquid composition | Binder | Addition amount as concerted into solid content | Surfactant | Addition amount as concerted into solid content | Particle | Addition amount as concerted into solid content |
|---|---|---|---|---|---|---|
| Coating liquid 3-A | Acrylic A | 89.0% | Surfactant A | 10% | Particle A | 1.0% |
| Coating liquid 3-B | Acrylic B | 90.0% | Surfactant B | 8% | Particle B | 2.0% |
| Coating liquid 3-C | Acrylic B | 91.0% | Surfactant C | 8.5% | Particle B | 0.5% |
| Coating liquid 3-D | Polyester A | 94.5% | Surfactant B | 5.0% | Particle A | 0.5% |
| Coating liquid 3-E | Polyester B | 80.0% | Surfactant B | 15.0% | Particle C | 5.0% |

Advantageous Effects of Invention

According to the present invention, though the uniaxially stretched multi-layer laminate film of the present invention is a polymer film having a multi-layer structure using a polyethylene naphthalate-based polymer for a layer having high refractive index characteristics, not only polymerization performance is provided, but also the interlayer adhesion is improved. For that reason, the uniaxially stretched multi-layer laminate film of the present invention can be, for example, used as a brightness enhancement member, a reflective polarizing plate, and the like for which polymerization performance is required. In that case, in view of the fact that by sticking to other member to incorporate into a liquid crystal display, interlayer exfoliation to be caused due to an external force applied at the time of use or the like is hardly caused, it is possible to provide a brightness enhancement member, a polarizing plate for liquid crystal display, and the like having higher reliability.

In addition, according to a preferred embodiment of the present invention, not only more excellent polarization performance is provided, but also interlayer adhesion is improved. For that reason, the uniaxially stretched multi-layer laminate film of the present invention can be, for example, used as a brightness enhancement member for which high polarization performance is required, a polarizing plate of liquid crystal display for which a high polarization degree is required, and the like. In that case, similar to the above, in view of the fact that the interlayer exfoliation is hardly caused, it is possible to provide a brightness enhancement member, a polarizing plate for liquid crystal display, and the like having higher reliability.

Furthermore, according to another preferred embodiment of the present invention, in view of the fact that the uniaxially stretched multi-layer laminate film of the present invention is provided with reflective polarization performance and high adhesion between the film and a prism layer to be formed on the film, it is possible to provide a high-quality complex optical film in which a function of a brightness enhancement film and a function of a prism are unified.

INDUSTRIAL APPLICABILITY

Though the uniaxially stretched multi-layer laminate film of the present invention is a polymer film having a multi-layer structure using a polyethylene naphthalate-based polymer for a layer having high refractive index characteristics, not only polymerization performance is provided, but also the interlayer adhesion is improved. For that reason, when the uniaxially stretched multi-layer laminate film of the present invention is, for example, used as a brightness enhancement member or a reflective polarizing plate for which polymerization performance is required, a polarizing plate of liquid crystal display for which a high polarization degree is required, and the like, in view of the fact that by sticking to other member to incorporate into a liquid crystal display, interlayer exfoliation to be caused due to an external force applied at the time of use or the like is hardly caused, it is possible to provide a brightness enhancement member, a polarizing plate for liquid crystal display, and the like having higher reliability. Therefore, the industrial applicability of the present invention is high.

The invention claimed is:

1. A uniaxially stretched multi-layer laminate film comprising a first layer and a second layer alternately laminated to each other, wherein
    (1) the first layer is a layer containing a polyester, the polyester containing an ethylene naphthalate unit in an amount of 50 mol % or more and 100 mol % or less based on a repeating unit that constitutes the polyester, and (2) a polymer that forms the second layer is a copolymer polyester containing, as copolymer components, a 2,6-naphthalenedicarboxylic acid component, an ethylene glycol component, and a trimethylene glycol component, (A) the content of said ethylene naphthalate unit in the polyester of the first layer being 80 mol % or more and 100 mol % or less based on the repeating unit that constitutes the polyester, or (B) the polymer that forms the second layer being the copolymer polyester further containing, as a copolymer component, an alicyclic diol component.

2. A uniaxially stretched multi-layer laminate film comprising a first layer and a second layer alternately laminated to each other, wherein (1) the first layer is a layer containing a polyester, the polyester containing an ethylene naphthalate unit in an amount of 80 mol % or more and 100 mol % or less based on a repeating unit that constitutes the polyester, and (2) a polymer that forms the second layer is a copolymer polyester containing, as copolymer components, a 2,6-naphthalenedicarboxylic acid component, an ethylene glycol component, and a trimethylene glycol component.

3. The uniaxially stretched multi-layer laminate film according to claim 2, wherein the trimethylene glycol component is in an amount of 3 mol % to 50 mol % of the whole of diol components that constitute the copolymer polyester of the second layer, and a glass transition point of the copolymer polyester of the second layer is 85° C. or higher.

4. The uniaxially stretched multi-layer laminate film according to claim 2, wherein an average refractive index of the second layer is 1.55 or more and 1.65 or less.

5. The uniaxially stretched multi-layer laminate film according to claim 2, wherein the first layer has the content of said ethylene naphthalate unit in the polyester of 80 mol % or more and less than 100 mol % based on the repeating unit that constitutes the polyester and further contains, as a dicarboxylic acid component, a terephthalic acid component in an amount of more than 0 mol % and 20 mol % or less.

6. A uniaxially stretched multi-layer laminate film comprising a first layer and a second layer alternately laminated to each other, wherein (1) the first layer is a layer containing a polyester, the polyester containing an ethylene naphthalate unit in an amount of 50 mol % or more and 100 mol % or less based on a repeating unit that constitutes the polyester, and (2) a polymer that forms the second layer is a copolymer polyester containing, as copolymer components, a 2,6-naphthalenedicarboxylic acid component, an ethylene glycol component, an alicyclic diol component, and a trimethylene glycol component.

7. The uniaxially stretched multi-layer laminate film according to claim 6, wherein the first layer has the content of said ethylene naphthalate unit in the polyester of 50 mol % or more and less than 100 mol % based on the repeating unit that constitutes the polyester and further contains, as a dicarboxylic acid component, a component represented by the following formula (A) in an amount of more than 0 mol % and 50 mol % or less:

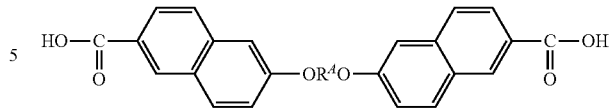

wherein $R^A$ represents an alkylene group having 2 to 10 carbon atoms.

8. The uniaxially stretched multi-layer laminate film according to claim 6, wherein the first layer has the content of said ethylene naphthalate unit in the polyester of 50 mol % or more and less than 100 mol % based on the repeating unit that constitutes the polyester and further contains, as a dicarboxylic acid component, a component represented by the following formula (B) in an amount of more than 0 mol % and 50 mol % or less:

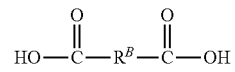

wherein $R^B$ represents a biphenyl group.

9. The uniaxially stretched multi-layer laminate film according to claim 6, wherein the alicyclic diol component is at least one member selected from spiro glycol, tricyclodecane dimethanol, and cyclohexane dimethanol.

10. The uniaxially stretched multi-layer laminate film according to claim 6, wherein the copolymer polyester that forms the second layer further contains a dicarboxylic acid component represented by the following formula (A):

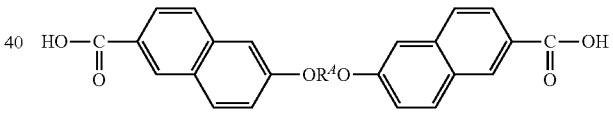

wherein $R^A$ represents an alkylene group having 2 to 10 carbon atoms.

11. The uniaxially stretched multi-layer laminate film according to claim 1, wherein a polarization degree (P) represented by the following equation (1) is 80% or more:

Polarization degree$(P)=\{(Ts-Tp)/(Tp+Ts)\}\times 100$    (1)

wherein Tp represents an average transmission for P-polarized light in a wavelength range of 400 to 800 nm, and Ts represents an average transmission for S-polarized light in a wavelength range of 400 to 800 nm.

12. The uniaxially stretched multi-layer laminate film according to claim 1, wherein a number of lamination of the uniaxially stretched multi-layer laminate film is 101 layers or more.

13. The uniaxially stretched multi-layer laminate film according to claim 1, wherein a thick film layer composed of the composition of the second layer and having a thickness of 5 μm or more and 50 μm or less is provided on both surface layers of the uniaxially stretched multi-layer laminate film.

14. The uniaxially stretched multi-layer laminate film according to claim 1, wherein a coating layer is provided at least on any one surface of outermost layers of the uniaxially stretched multi-layer laminate film, and the coating layer contains an acrylic binder.

15. The uniaxially stretched multi-layer laminate film according to claim 1, which is a brightness enhancement member or a reflection type polarizing plate.

16. An optical member comprising a prism layer or a diffusion layer on at least one surface of the uniaxially stretched multi-layer laminate film according to claim 1.

17. The uniaxially stretched multi-layer laminate film according to claim 1, which is a liquid crystal display polarizing plate adjacent to a liquid crystal cell.

18. A polarized plate for liquid crystal display comprising the uniaxially stretched multi-layer laminate film according to claim 1.

19. An optical member for liquid crystal display comprising a first polarizing plate composed of the polarized plate for liquid crystal display according to claim 18; and a second polarizing plate laminated in this order.

20. A liquid crystal display comprising a light source and the optical member for liquid crystal display according to claim 19, the first polarizing plate being disposed on the light source side.

\* \* \* \* \*